US010760622B2

(12) United States Patent
Greene et al.

(10) Patent No.: US 10,760,622 B2
(45) Date of Patent: Sep. 1, 2020

(54) SELECTABLE ONE-WAY CLUTCH HAVING STRUT WITH SEPARATE ARMATURE

(71) Applicant: MAGNA POWERTRAIN INC., Concord (CA)

(72) Inventors: Darrell F. Greene, Bradford (CA); Adrian C. Cioc, North York (CA)

(73) Assignee: MAGNA POWERTRAIN, INC., Concord (CA)

( * ) Notice: Subject to any disclaimer, the term of this patent is extended or adjusted under 35 U.S.C. 154(b) by 92 days.

(21) Appl. No.: 16/276,054

(22) Filed: Feb. 14, 2019

(65) Prior Publication Data

US 2019/0178308 A1    Jun. 13, 2019

Related U.S. Application Data

(63) Continuation of application No. 14/906,097, filed as application No. PCT/CA2014/000586 on Jul. 29, 2014, now Pat. No. 10,208,811.

(60) Provisional application No. 61/866,755, filed on Aug. 16, 2013, provisional application No. 61/859,514, filed on Jul. 29, 2013.

(51) Int. Cl.
| *F16D 27/09* | (2006.01) |
| *F16D 41/16* | (2006.01) |
| *F16D 41/12* | (2006.01) |
| *F16D 27/14* | (2006.01) |
| *F16D 41/08* | (2006.01) |
| *F16D 41/14* | (2006.01) |
| *F16D 27/118* | (2006.01) |

(52) U.S. Cl.
CPC ............. *F16D 27/09* (2013.01); *F16D 27/14* (2013.01); *F16D 41/12* (2013.01); *F16D 41/16* (2013.01); *F16D 27/118* (2013.01); *F16D 41/084* (2013.01); *F16D 41/14* (2013.01)

(58) Field of Classification Search
CPC ........ F16D 41/084; F16D 41/14; F16D 41/16; F16D 27/09; F16D 27/102
See application file for complete search history.

(56) References Cited

U.S. PATENT DOCUMENTS

| 6,290,044 B1 | 9/2001 | Burgman et al. |
| 7,383,930 B2 | 6/2008 | Kimes et al. |
| 7,455,157 B2 | 11/2008 | Kimes et al. |

(Continued)

FOREIGN PATENT DOCUMENTS

| CN | 101096982 A | 1/2008 |
| CN | 101240821 A | 8/2008 |

OTHER PUBLICATIONS

International Search Report dated Oct. 23, 2014 from corresponding International Patent Application Serial No. PCT/CA2014/000586.

(Continued)

*Primary Examiner* — David R Morris
(74) *Attorney, Agent, or Firm* — Dickinson Wright PLLC

(57) ABSTRACT

A selectable one-way clutch includes a clutch module and at least one electromagnetic actuator module. Each electromagnetic actuator module includes at least one electromagnetic actuator assembly having a coil assembly, a locking strut, and a connection member mechanically interconnected to the locking strut for moving it between released and deployed positions in response to energization of the coil assembly.

20 Claims, 14 Drawing Sheets

(56) References Cited

U.S. PATENT DOCUMENTS

| | | | |
|---|---|---|---|
| 7,484,605 B2 | 2/2009 | Pawley et al. | |
| 7,614,486 B2 | 11/2009 | Bird et al. | |
| 7,743,678 B2 | 6/2010 | Wittkopp et al. | |
| 7,766,790 B2 | 8/2010 | Stevenson et al. | |
| 8,079,453 B2 | 12/2011 | Kimes | |
| 8,196,724 B2 | 6/2012 | Samie et al. | |
| 8,276,725 B2 * | 10/2012 | Swales | F16D 27/118 192/43.1 |
| 8,403,123 B2 | 3/2013 | Bird et al. | |
| 8,418,825 B2 * | 4/2013 | Bird | F16D 41/125 192/46 |
| 8,491,439 B2 | 7/2013 | Kimes | |
| 8,720,659 B2 | 5/2014 | Pawley | |
| 9,127,724 B2 | 9/2015 | Kimes et al. | |
| 9,127,730 B2 | 9/2015 | Greene et al. | |
| 9,234,552 B2 * | 1/2016 | Kimes | F16D 27/09 |
| 9,255,614 B2 | 2/2016 | Kimes | |
| 9,482,294 B2 * | 11/2016 | Kimes | F16D 41/125 |
| 9,541,141 B2 * | 1/2017 | Kimes | F16D 27/10 |
| 9,562,574 B2 * | 2/2017 | Kimes | F16D 27/108 |
| 9,638,266 B2 | 5/2017 | Kimes | |
| 9,739,322 B2 | 8/2017 | Greene et al. | |
| 9,915,301 B2 | 3/2018 | Bird | |
| 10,533,617 B2 * | 1/2020 | Uppal | F16D 41/14 |
| 2006/0278486 A1 | 12/2006 | Pawley et al. | |
| 2007/0131509 A1 | 6/2007 | Kimes | |
| 2009/0194381 A1 | 8/2009 | Samie et al. | |
| 2011/0011694 A1 | 1/2011 | Swales et al. | |
| 2011/0290608 A1 | 12/2011 | Bird et al. | |
| 2012/0103745 A1 | 5/2012 | Bird | |
| 2012/0103746 A1 | 5/2012 | Bird | |
| 2013/0319810 A1 | 12/2013 | Bird | |
| 2014/0102844 A1 | 4/2014 | Greene et al. | |
| 2014/0284167 A1 | 9/2014 | Kimes | |
| 2014/0305761 A1 | 10/2014 | Kimes | |
| 2015/0204390 A1 | 7/2015 | Kimes | |
| 2015/0204391 A1 | 7/2015 | Kimes | |
| 2015/0204392 A1 * | 7/2015 | Kimes | F16D 41/02 192/46 |
| 2015/0377306 A1 | 12/2015 | Greene et al. | |
| 2016/0201738 A1 * | 7/2016 | Kimes | F16D 27/00 192/84.8 |
| 2016/0201739 A1 * | 7/2016 | Kimes | F16D 41/02 192/84.92 |
| 2016/0201740 A1 * | 7/2016 | Kimes | F16D 27/00 192/46 |
| 2017/0138414 A1 | 5/2017 | Cioc et al. | |
| 2018/0022201 A1 | 1/2018 | Samila et al. | |
| 2018/0058518 A1 | 3/2018 | Uppal et al. | |

OTHER PUBLICATIONS

Search Report dated Mar. 21, 2017 from corresponding Chinese Patent Application No. 201480042715.1.

* cited by examiner

SELECTABLE ONE-WAY CLUTCH HAVING STRUT WITH SEPARATE ARMATURE

CROSS-REFERENCE TO RELATED APPLICATIONS

This application is a continuation of U.S. application Ser. No. 14/906,097 filed Jan. 19, 2016, which is a U.S. National Stage Application of International Patent Application No. PCT/CA2014/000586 filed Jul. 29, 2014, which claims the benefit of and priority to U.S. Provisional Application No. 61/859,514 filed Jul. 29, 2013 and U.S. Provisional Application 61/866,755 filed Aug. 16, 2013. The disclosure of each of the aforementioned applications is incorporated by reference as if fully set forth in its entirety herein.

FIELD OF THE INVENTION

The present disclosure is generally related to overrunning coupling devices such as one-way clutches or brakes and, more specifically to selectable one-way coupling (SOWC) devices having an electromagnetic actuator assembly.

BACKGROUND OF THE INVENTION

This section provides background information related to the present disclosure which is not necessarily prior art.

Automatic transmissions provide a plurality of forward and reverse speed or gear ratios by selectively actuating one or more clutches and/or brakes to establish a torque-transmitting drive connection between a transmission input and a transmission output for supplying motive power (i.e., drive torque) from a powertrain to a driveline in a motor vehicle. One type of brake or clutch widely used in automatic transmission is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Such conventional overrunning coupling devices provide no independent control over their modes of operation, that is to say whether they lockup or freewheel in both directions. Thus, basic one-way clutches provide a "locked" mode in one rotary direction and a "freewheel" mode in the opposite direction based on the direction that the drive torque is being applied to the input race or drive plate.

There are however, requirements in modern automatic transmissions where a "controllable" overrunning coupling device, commonly referred to as a selectable one-way clutch (SOWC), can be selectively controlled to provide additional functional modes of operation. Specifically, a selectable one-way clutch may further be capable of providing a freewheel mode in both rotary directions until a command signal (i.e., from the transmission controller) causes a power-operated actuator to shift the coupling device into its lockup mode. Thus, a selectable one-way clutch may be capable of providing a drive connection between an input member and an output member in one or both rotational directions and it may also be operable to freewheel in one or both directions.

In some instances, the selectable one-way clutches installed in automatic transmissions utilize a hydraulic actuator to selectively actuate the overrunning coupling and shift between the available operating modes. Examples of conventional selectable one-way clutches that are hydraulically-actuated are disclosed in U.S. Pat. Nos. 6,290,044, 8,079,453 and 8,491,439. In contrast, it is also known to use an electro-mechanical actuator with the selectable one-way clutch, one example of which is disclosed in U.S. Pat. No. 8,196,724.

As a further alternative, much development has recently been directed to electromagnetic actuators for use with selectable one-way clutches, examples of which are disclosed in U.S. Pat. Nos. 8,276,725 and 8,418,825 and U.S. Publication 2013/0319810. In most electromagnetic actuators, a rocker-type locking element, commonly referred to as a strut, is pivoted from a first position to a second position in response to energization of a coil assembly. In most conventional selectable one-way clutches equipped with an electromagnetic actuator, a direct-acting configuration is used such that the strut is part of the magnetic circuit and its pivotal movement is caused by an attraction force applied directly to the strut via energization of the coil assembly. Therefore, precise control of the air gap established between the core/pole piece of the coil assembly and the strut is required to provide robust and reliable lockup functionality.

While all of the different types of selectable one-way clutches mentioned above appear to meet all functional requirements, a need exists to continue development of new and improved power-operated actuators that advance the art and provide enhanced functionality.

SUMMARY OF THE INVENTION

This section provides a general summary of the disclosure and is not intended to be interpreted as a complete and comprehensive disclosure of all of its aspects, objectives, features and advantages.

It is an aspect of the present disclosure to provide an electromagnetic actuator module for use with a selectable one-way clutch having an indirect actuation configuration provided between the energizable coil assembly and the locking element.

It is another aspect to provide a selectable one-way clutch assembly comprised of a clutch mode and at least one electromagnetic actuator module having at least one electromagnetic actuator. The electromagnetic actuator includes an energizeable coil assembly, a locking strut, and an intermediate member mechanically connected to the locking strut and operable to move the locking strut between its released and locked positions relative to cam surfaces on a clutch member associated with the clutch module.

In accordance with these and other aspects of the present disclosure, a clutch assembly is provided having a clutch module and at least one electromagnetic actuator module. The clutch module includes a first clutch member and a second clutch member having a plurality of cam surfaces, at least one of the first and second clutch members being adapted to rotate relative to the other clutch member. The electromagnetic actuator module may include a frame adapted to be mounted to the first clutch member and at least one electromagnetic actuator mounted to the frame. The electromagnetic actuator includes an energizeable coil assembly secured to the frame, a connection member mounted to the frame for pivotal movement relative to the coil assembly between a non-actuated position and an actuated position, a locking member mechanically interconnected to the connection member for movement between a released position and a deployed position in response to pivotal movement of the connection member between its non-actuated position and its actuated position, and a biasing member for normally biasing the locking member into its released position. Energization of the coil assembly generates a magnetic circuit that causes the connection member to move to its actuated position which concomitantly causes the locking member to move to its deployed position in opposition to the biasing exerted by the biasing member. The locking member is released from engagement with the cam surfaces when located in its released position and is lockingly engaged with one of the cam surfaces when located in its deployed position.

In accordance with one embodiment, the connection member is a magnetic armature having a first end segment pivotably coupled to the frame and a second end segment mechanically interconnected to the locking member. In one preferred arrangement, the armature and locking member are oriented in an offset configuration. In another preferred arrangement, the armature is oriented to be located between the coil assembly and the locking member in an under-strut configuration.

In accordance with another embodiment, the coil assembly is a solenoid having a linearly-moveable plunger operably coupled to the connection member to control movement of the connection member in response to energization of the solenoid.

Further areas of applicability of the present disclosure will become apparent from the detailed description, drawings and specific example provided hereinafter. It should be understood that the detailed description, drawings and specific examples, while indicating preferred embodiments of the present disclosure, are intended for purposes of illustration only and are not intended to limit the scope of the invention.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DETAILED DESCRIPTION

Figure 1:
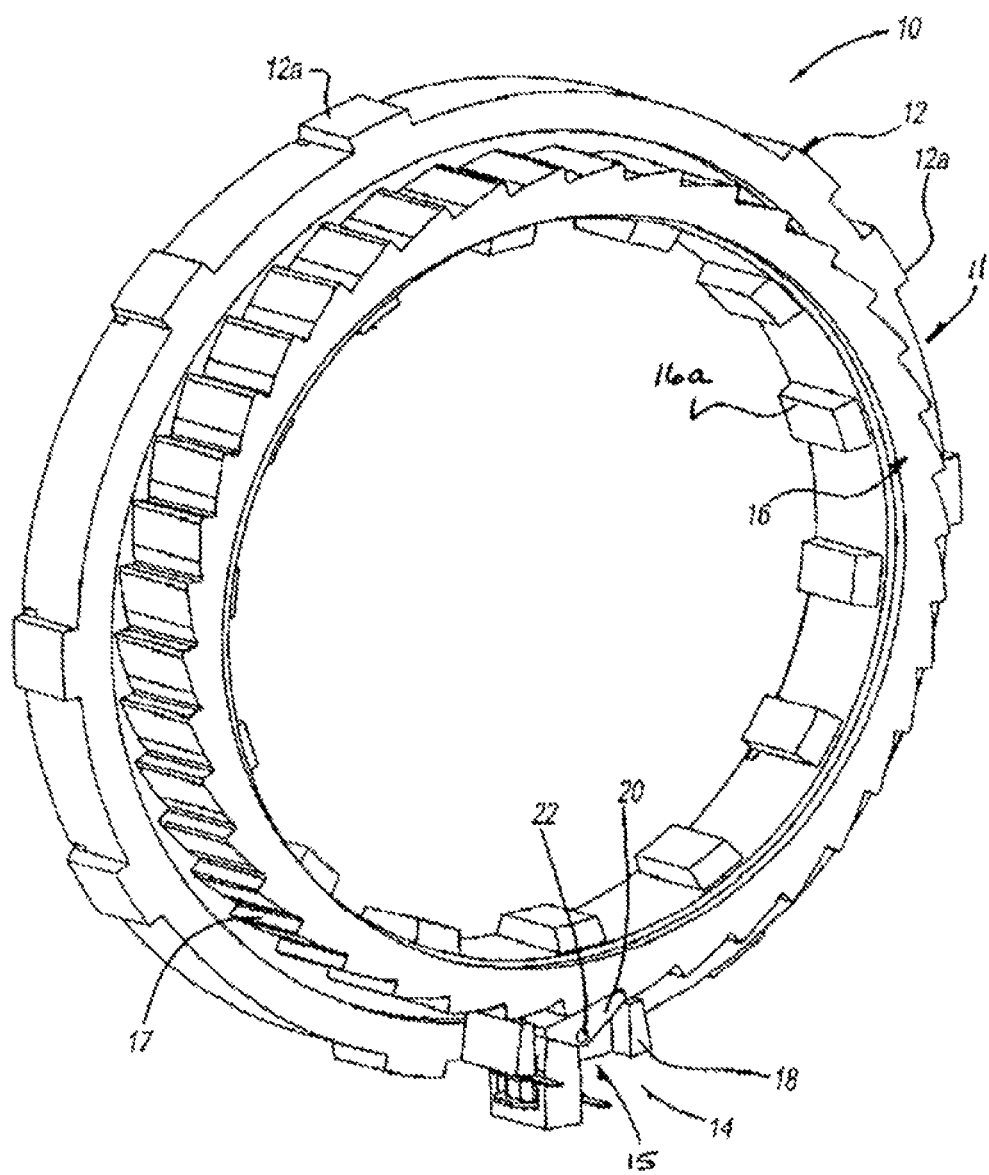
FIG. 1 is an isometric view of a selectable one-way clutch (SOWC) shown to include a clutch module and an electromagnetic actuator module and which is constructed in accordance with the present disclosure.

Example embodiments will now be described more fully with reference to the accompanying drawings. Each of the example embodiments is directed to an electromagnetically-actuated overrunning coupling device, hereinafter referred to as a selectable one-way clutch (SOWC). In general, each example embodiment employs one or more electromagnetic actuator modules in a SOWC which advances the technology over conventional SOWC products. However, the example embodiments only are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The present disclosure is generally related to electromechanical rocker clutches that function to transmit torque mechanically but which are actuated via electrical actuation/controls. When a voltage and/or current is applied to an electromagnetic coil assembly or a plurality of coil assemblies, the coil assemblies becomes an electromagnet and produces a magnetic field. The magnetic flux flows around a magnetic circuit established between the components and is transferred across a small air gap between a moveable rocker-type locking member, commonly referred to as a strut, and a core/pole unit associated with the coil assembly. Magnetization of the core/pole unit functions to magnetically attract the strut for moving the strut from a first or "released" position toward a second or "locked" position. The strut is normally biased toward its released position by a biasing spring. In accordance with alternative arrangements, the magnetic flux flows around the magnetic circuit and is transferred across a small air gap established between a moveable armature and a core/pole unit associated with the coil assembly. Magnetization of the core/pole unit functions to magnetically attract the armature for moving the armature from a first or "non-actuated" position toward a second or "actuated" position. The resulting movement of the armature from its first position to its second position causes the strut to move from its "released" position toward its "locked" position based on a mechanical connection established between the strut and the armature. The coil assembly, the armature, and the strut define an electromagnetic actuator that is mounted to a first member of a clutch module.

Movement of the strut to its locked position causes a locking segment of the strut to engage one of a plurality of locking teeth associated with a second member of the clutch module, thereby coupling the first member to the second member for rotation together or against rotation in a certain rotational direction. Disengagement occurs as the voltage and/or current is removed from the coil assembly such that the strut or the armature is demagnetized and freed from attraction toward the core of the coil assembly. As such, the biasing member is permitted to forcibly urge the strut to pivot from its locked position back to its released position which, in turn, causes the armature to move from its actuated position to its non-actuated position.

In accordance with the present invention there is provided a clutch assembly, generally shown at 10, of the type, for example, for use in an automatic transmission (not shown) which is controlled using an on-off relay to actuate a clutch mechanism. Clutch assembly 10 is disclosed to be a controllable overrunning coupling device, commonly referred to as a selectable one-way clutch (SOWC). For the purpose of this application, the term "clutch assembly" should be interpreted to include couplings, clutches and brakes wherein one component is driveably connected to a torque delivery component of the transmission while the other component is driveably connected to another torque delivery component or is non-rotatably fixed to a transmission housing or stationary component. As such, the terms "coupling", "clutch" and brake may be used interchangeably.

Referring to the drawings, and initially to FIGS. 1-4, there is provided a clutch assembly 10 having a clutch module 11 and at least one electromagnetic actuation module 14. The clutch module 11 includes a first clutch member 12 supporting the at least one elctromagnetic actuation module 14, and a second clutch member 16 having a plurality of cam surfaces 17 formed thereon which are configured for selective engagement with a moveable locking element associated with electromagnetic actuation module 14. The clutch members 12 and 16 are aligned co-axially adjacent to each other and at least one of the clutch members is adapted to rotate relative to the other clutch member. The clutch members 12 and 16 include engagement hubs or splines 12a and 16a respectively to facilitate connection of each to another rotary or non-rotary component of the transmission.

The electromagnetic actuation module 14 is generally shown to include a frame 18 with a single electromagnetic actuator 15. The electromagnetic actuator 15 includes a locking element or strut 20 that is pivotally movable with respect to frame 18 about a pivot 22. Frame 18 is adapted to be fixedly secured to first clutch member 12 in the particular configuration shown. The strut 20 includes an engagement end segment 26 and a base end segment 24 and further includes a first side segment 28 and a second side segment 30. A pin or post 32 extends from the frame 18. The electromagnetic actuator 15 also includes a coil assembly 35 mounted on post 32. The coil assembly 35 includes an insulated bobbin 34 with an energizable coil 36 that is wound to surround the bobbin 34, and a U-shaped pole member 37 that is secured magnetically and mechanically to the post 32 by way of a screw or other fastener 39. The U-shaped pole member 37 includes a pair of laterally-spaced actuation leg sections 38 and 40 interconnected by a base segment 41. A biasing spring 42 (such as the accordion spring shown) is provided in a bore 44 formed in post 32 of frame 18. At rest, the biasing spring 42 acts on the strut 20 and biases the engagement end segment 26 out of engagement with the cam surfaces 17 to provide a normally disengaged or freewheeling condition, whereby second clutch member 16 is permitted to rotate relative to first clutch member 12. The peripheral ends 46 and 48 of pole leg segments 38 and 40 form a magnetic air gap with respect to the base end segment 24 of the strut 20.

When the coil 36 is energized, the peripheral ends 46 and 48 of the leg segments 38 and 40 are polarized in a first polarity and the frame 18 and the strut 20 are polarized with an opposite polarity, thereby attracting base end segment 24 of the strut 20 toward the peripheral ends 46 and 48. This attraction causes the engagement end segment 26 of the strut 20 to pivot into engagement with one of the cam surfaces 17 on the second clutch member 16.

Typically, the electromagnetic actuation module 14 may be contained in or mounted to metallic frame 18. Thus, in the present invention, the frame 18 can be used as an integral component of the magnetic circuit for controlling actuation of the clutch assembly 10. When the coil 36 is powered, the frame 18 is magnetized and will take a particular polarity (i.e., either north or south as may be desired) that is opposite from a polarity of the magnetic poles of the actuator which, in this instance, is the U-shaped pole member 37. Since the frame 18 is in contact with struts, the struts will be magnetized with the same polarity as the frame 18. In this application, the attraction force between the strut ends and the magnetic poles of the U-shaped pole member 37 (i.e., across the air gap between them) is greatly increased as compared with the case where the struts carry a neutral charge from a magnetic perspective.

Figure 15:
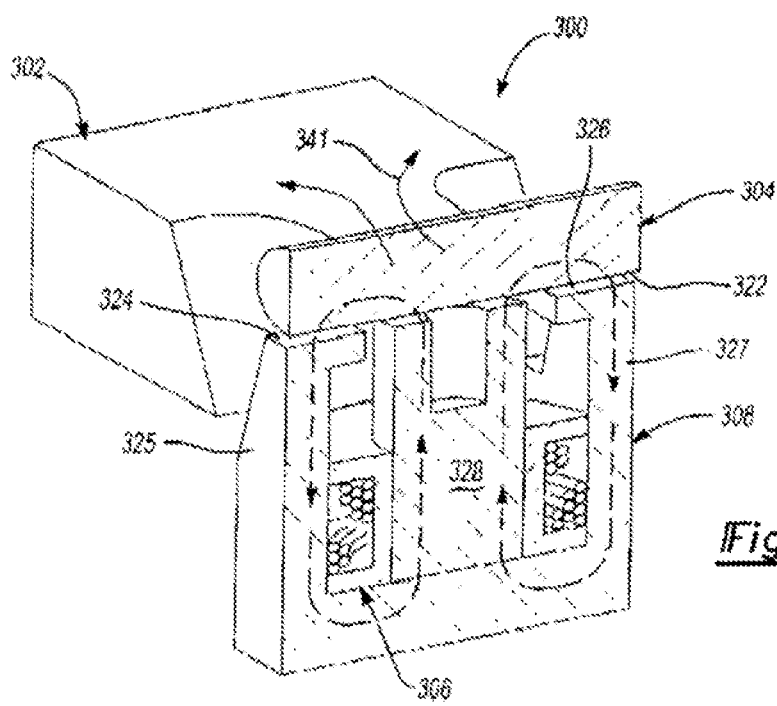
FIG. 15 is a sectional view illustrating a magnetic leakage path between the strut and the housing in direct-acting electromagnetic actuator modules.

While the strut 20 is shown to be pivotably supported on a pin 22 from frame 18, it is to be appreciated by those skilled in the art that the strut can also be configured for pivotable movement within a recess formed in frame 18 or, in the alternative, formed within a suitable housing portion of the first member 12. FIG. 15 is generally similar to FIG. 1 except that a plurality of electromagnetic actuation modules 14 are shown in association with clutch module 11. Specifically, a plurality of four (4) equally-spaced actuation modules 14 are secured to first clutch member 12 of clutch module 11. Obviously, any number of actuation modules 14 can be used, as well as circumferentially spaced in any desired orientation, to provide a selectable one-way clutch assembly.

Figure 2:
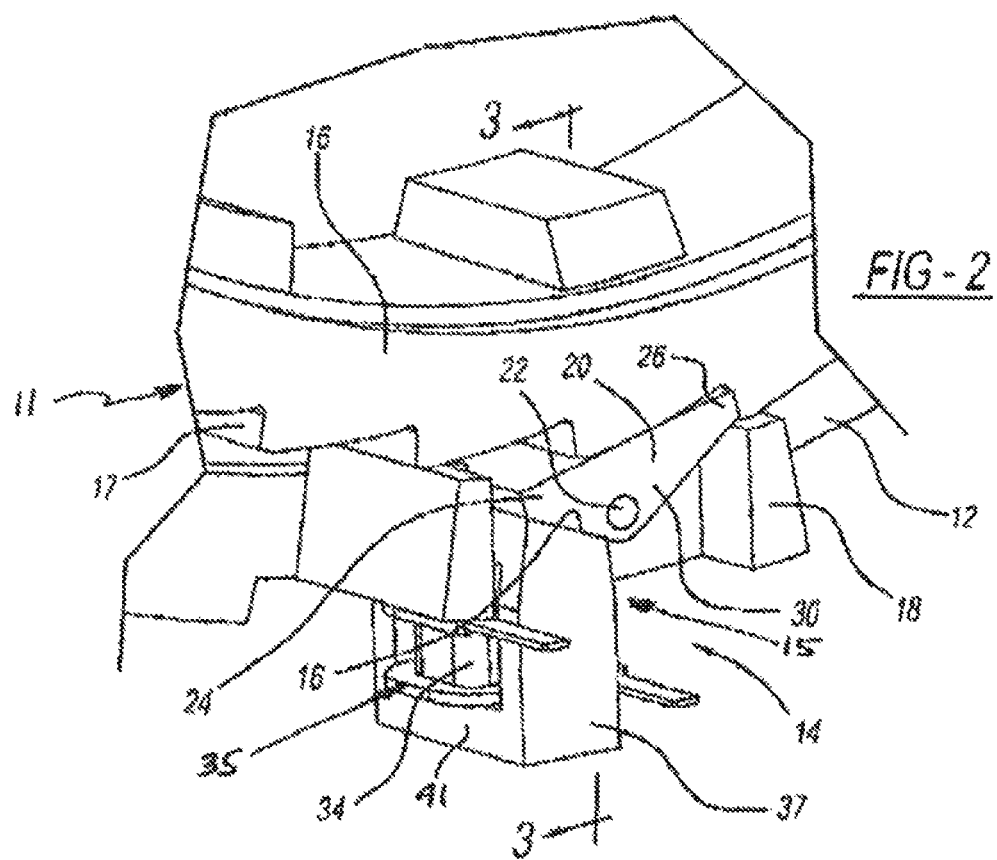
FIG. 2 is an enlarged partial view of FIG. 1 showing components of the electromagnetic actuator module in greater detail.
Figure 3:
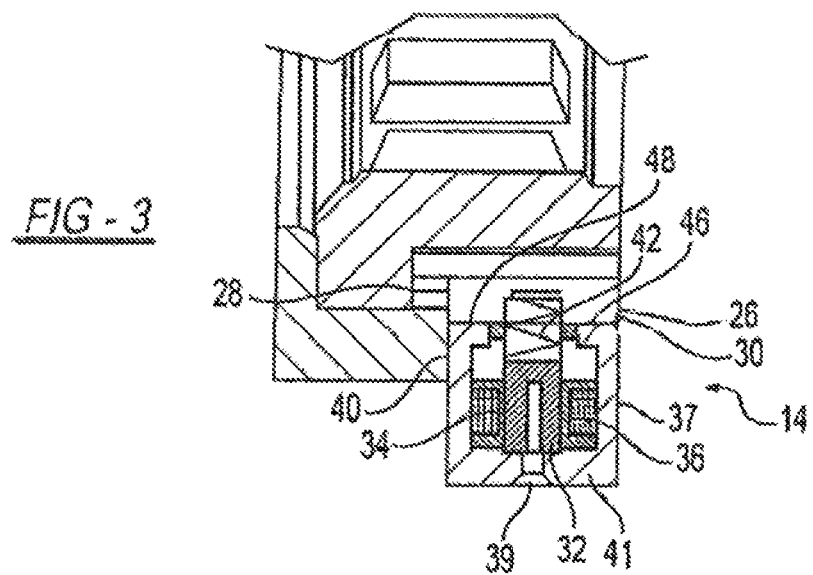
FIG. 3 is a sectional view of the electromagnetic actuator module taken generally along line 3-3 of FIG. 2.
Figure 4:
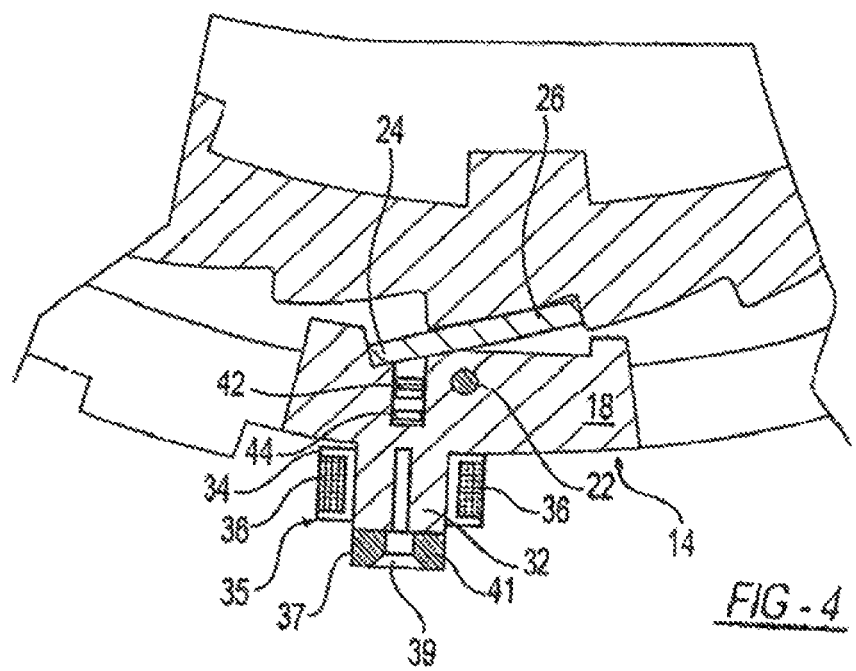
FIG. 4 is another sectional view of the electromagnetic actuator module.
Figure 6:
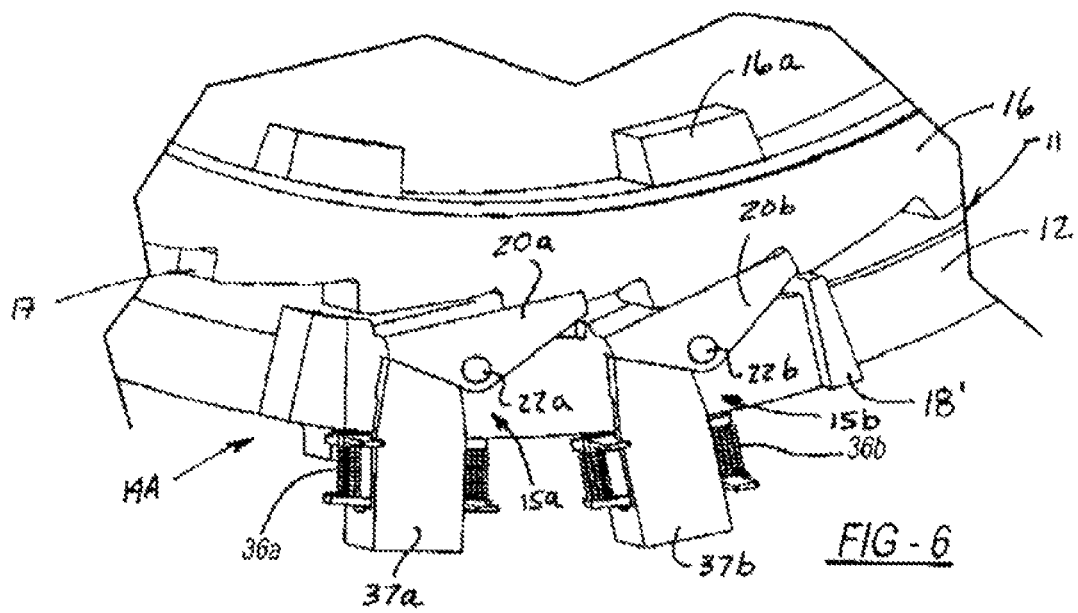
FIG. 6 is a detailed view of an alternative configuration for an electromagnetic actuator module adapted for use in association with the clutch module.

As can be seen from FIG. 6, an alternative embodiment of an electromagnetic actuation module 14A is generally similar to electromagnetic actuation module 14 of FIG. 2, except that a pair of struts and coil electromagnetic actuators 15 are mounted to a common frame 18'. Each electromagnetic actuator 15 is identified by common reference numerals, but has "a" and "b" suffixes. Accordingly, all of the coils 36a and 36b (e.g., two in the embodiment shown) will work together to magnetize frame 18; thereby increasing the magnetic field intensity and generating a greater magnetic attraction force in the struts 20a, 20b for pivoting them from the released position toward the deployed or locked position.

Figure 7:
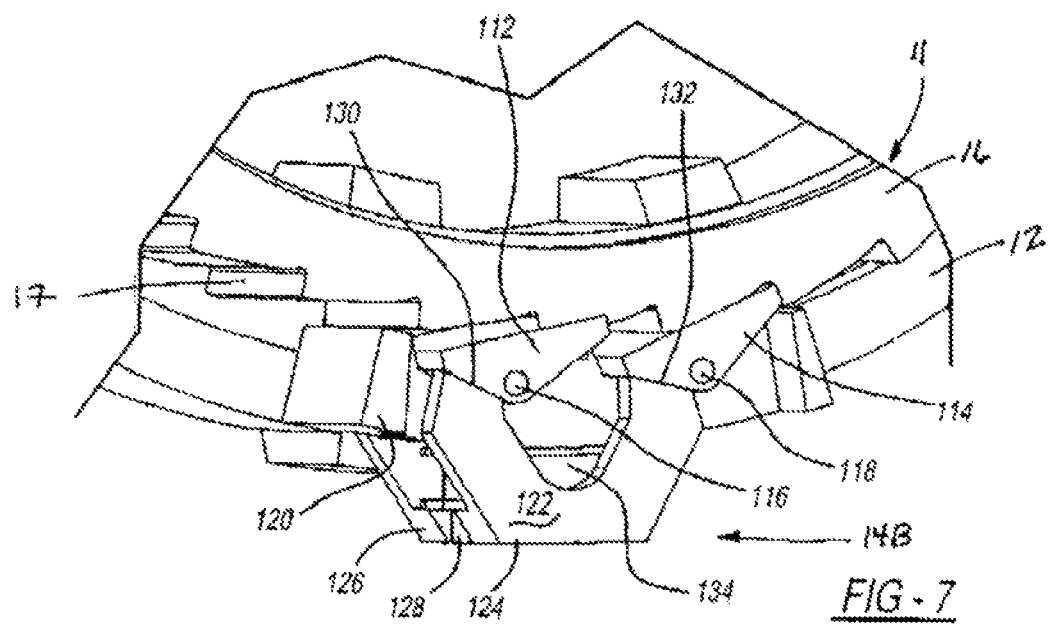
FIG. 7 is a detailed view of yet another alternative configuration for an electromagnetic actuator module adapted for use in association with the clutch module.
Figure 8:
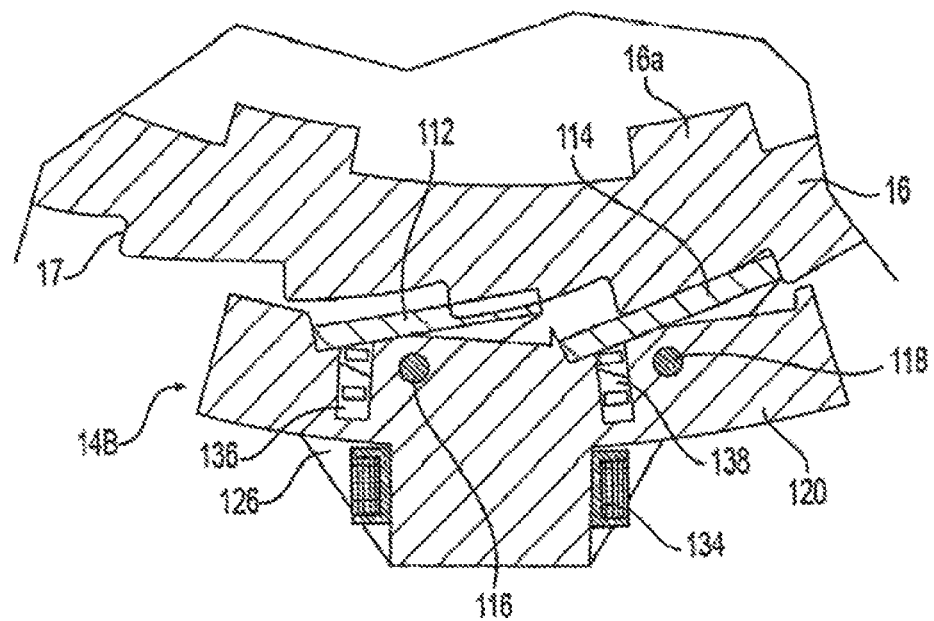
FIG. 8 is a sectional view of the electromagnetic actuator module shown in FIG. 7.

Referring now to FIGS. 7 and 8, there is provided another alternate embodiment of an electromagnetic actuation module 14B for use with clutch assembly 10. Actuation module 14B includes a pair of pivotal struts 112 and 114 which pivot on pins 116 and 118 respectively, and are attached to a frame 120 that is rigidly secured to first clutch member 12. A pole component 122 is provided which includes a first or front U-shaped member 124 and a second or rear U-shaped member 126 which are magnetically and electrically coupled to one another through a connection base member 128. Front U-shaped member 124 includes a pair of leg segments defining outer peripheral end portions 130 and 132 which engage the first sides of the struts 112 and 114. Rear U-shaped member 126 includes a pair of leg segments defining inner peripheral end portions (not shown) which are generally aligned respectively with outer peripheral end portions 130 and 132 and which engage the rear sides of struts 112 and 114. A single coil assembly having a central bobbin 134 and a coil winding 136 energizes the pole component 122 for providing the coordinated actuation of the multiple struts. It will be readily appreciated that while two struts are shown in association with electromagnetic actuator module 14B, this invention could be configured to actuate more than just two struts if desired. As best shown in FIG. 8, biasing springs 138 and 140 are provided for normally biasing the struts 112 and 114 into a freewheeling position. FIGS. 7 and 8 illustrate energization of coil 136 for causing the engagement end segments of the struts 112, 114 to be moved into engagement with ratchet teeth 17 on second clutch member 16.

Figure 9:
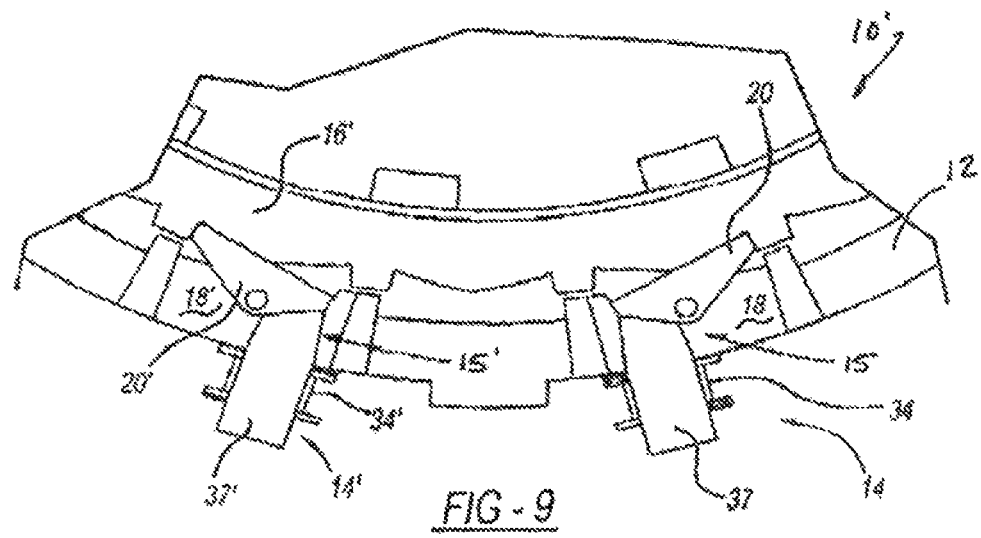
FIG. 9 is a detailed side view of a bi-directional electromagnetic actuator module constructed in accordance with the present disclosure and arranged for use in association with a bi-directional version of the clutch module.

FIG. 9 shows the use of a pair of mirror-image electromagnetic actuation modules 14 and 14' of the type originally shown in FIGS. 1-4 and as discussed above with the mirror image parts being labeled with primed numbers. The second clutch member 16' in this embodiment includes bi-directional cam members 17 and 17'. In operation, either actuation module, or sets of modules 14 or 14', can be energized depending on the direction which is desired for engaging or rotating the second clutch member 16' with respect to first clutch member 12. Accordingly, FIG. 9 illustrates a bi-directional selectable clutch assembly 10'.

Figure 10:
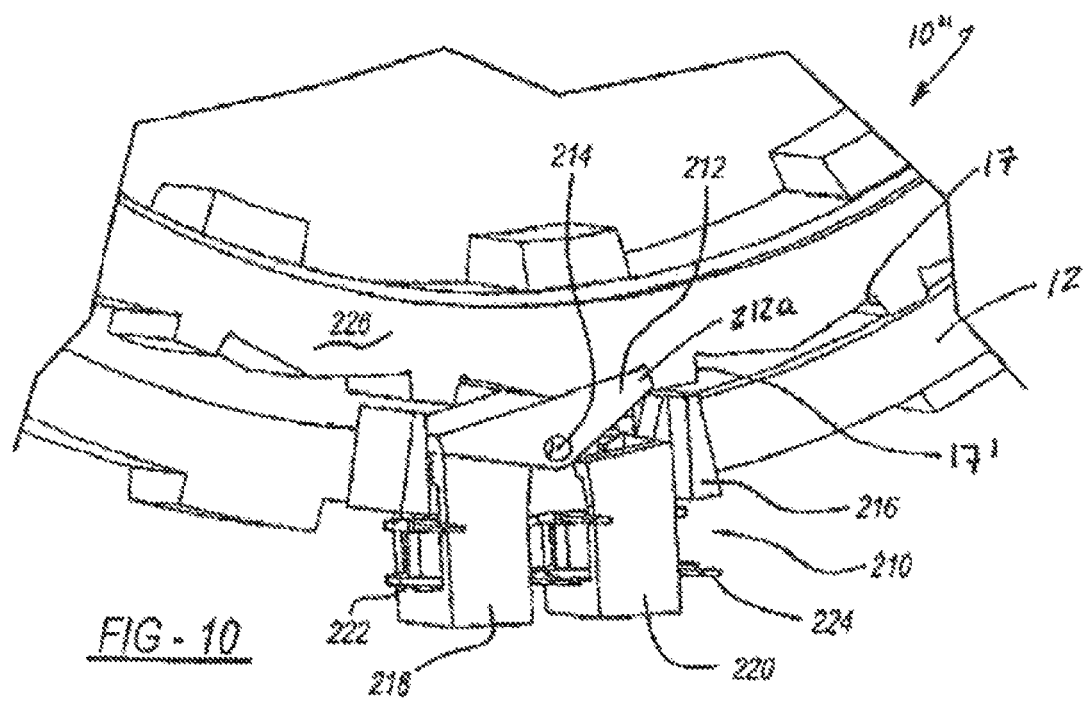
FIG. 10 is a detailed view of a selectable one-way clutch equipped with an alternative embodiment of a bi-directional electromagnetic actuator module for use in association with the bi-directional clutch module of FIG. 9.
Figure 11:
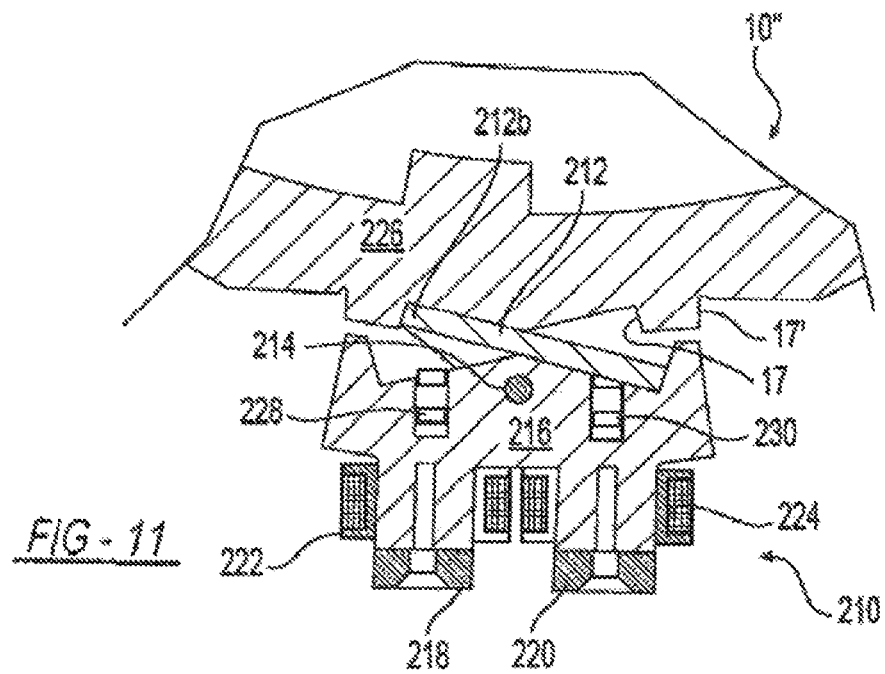
FIG. 11 is a sectional view of the bi-directional electromagnetic actuator module shown in FIG. 10.
Figure 12:
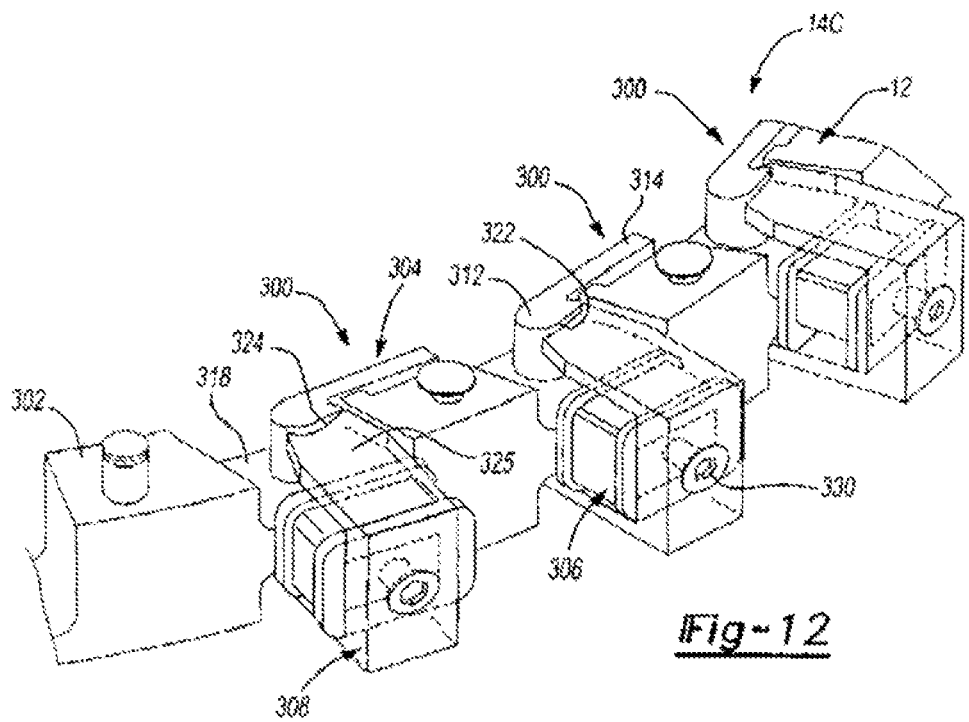
FIG. 12 is an isometric view of another embodiment of an electromagnetic actuator module constructed in accordance with the present disclosure.
Figure 13:
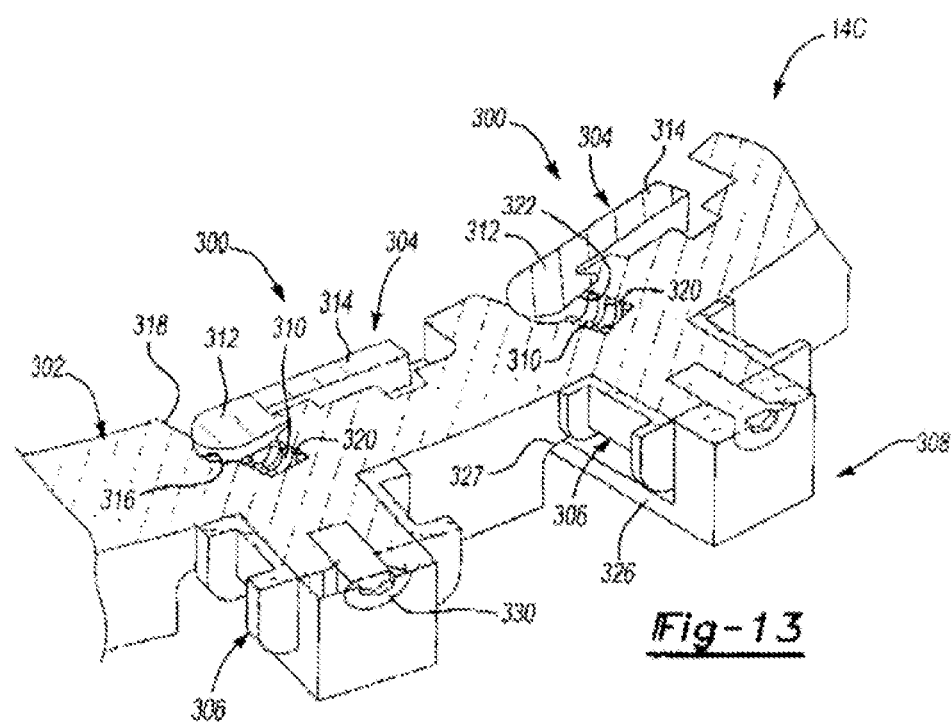
FIG. 13 is a sectional view taken through the electromagnetic actuator module of FIG. 12.

Referring now to FIGS. 10 and 11 there is shown another embodiment of a bi-directional selectable clutch assembly 10" equipped with an electromagnetic actuation module 210. In this particular embodiment, a symmetrical strut member 212 is pivotally attached by a pin 214 to a frame 216. A pair of U-shaped pole members 218 and 220 with separate coil and bobbin assemblies 222 and 224 are used to selectively actuate the strut 212 from a freewheel position. Biasing springs 228 and 230 are provided for cooperatively biasing the strut 212 to its free-wheeling position. FIG. 10 shows first coil/bobbin assembly 222 energized to cause strut 212 to move from its free-wheeling position into a first locked position such that end segment 212a engages cam surface 17 on clutch member 226 and prevents relative rotation in a first direction. In contrast, FIG. 11 shows second coil/bobbin assembly 224 energized to cause strut 212 to move from the free-wheeling position to a second locked position such that its end segment 212b engages cam surface 17' on clutch member 226 and prevents relative rotation in a second direction.

Figure 14:
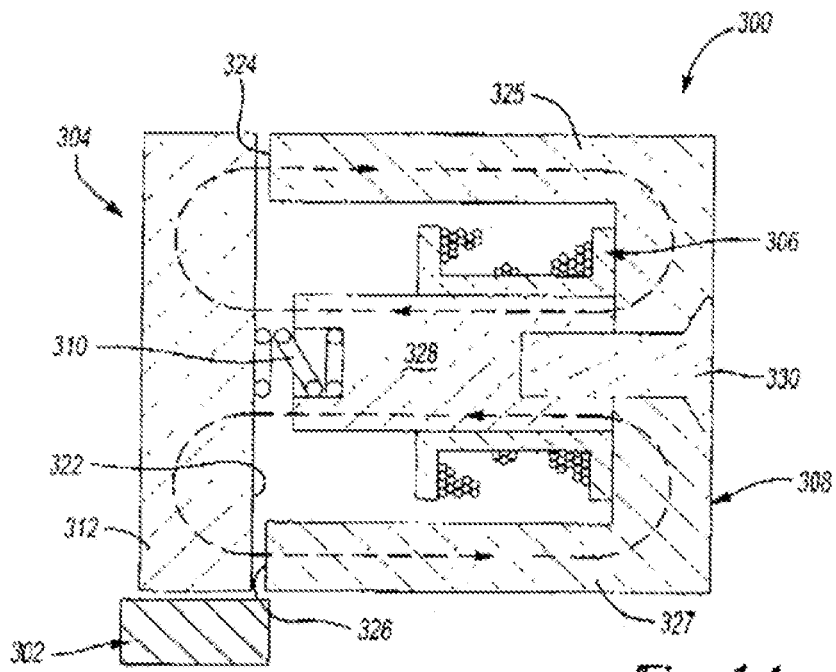
FIG. 14 is another sectional view taken through the electromagnetic actuator module of FIG. 12.

Referring now to FIGS. 12 through 15, another alternative construction for an electromagnetic actuator module 14C is disclosed that is generally similar to electromagnetic actuator module 14 of FIG. 2 with the exception that a plurality of three electromagnetic actuators 300 are mounted to a common frame 302 that is adapted to be rigidly secured to first clutch member 12 of the clutch module. Each electromagnetic actuator 300 includes a strut 304, a coil assembly 306, a U-shaped pole member 308, and a biasing member 310. Struts 304 include a pivot end segment 312 and an engagement end segment 314. Pivot end segment 312 of each strut 304 is seated in an axially-extending pivot channel 316 formed in a recessed portion 318 of frame 302. Each biasing member 310 is seated within a radial bore 320 formed in recessed portion 318 and is arranged to engage a surface portion 322 of pivot end segment 312 on a corresponding strut 304. Biasing members 310 are arranged to normally bias struts 304 to the released position shown. "Contoured" air gaps are established between surface portion 322 on pivot end segment 312 of each strut 304 and terminal ends 324, 326 of legs 325, 327 on each U-shaped pole member 308. This air gap is best illustrated in FIGS. 14 and 15.

U-shaped pole member 308 is secured magnetically and mechanically to a post portion 328 of coil assemblies 306 via a fastener 330. When coil assemblies 306 are energized, a magnetic circuit is established which causes pivot end segment 312 of struts 304 to pivot within pivot channels 316, in opposition to the biasing force applied thereon by biasing members 310, and cause engagement end segments 314 to move to its locked/deployed position for engagement with cam surfaces 17 on second clutch member 16. Since struts 304 are part of the magnetic circuit, they tend to be attracted to poles 325, 327 as well as frame 302.

Figure 16A:
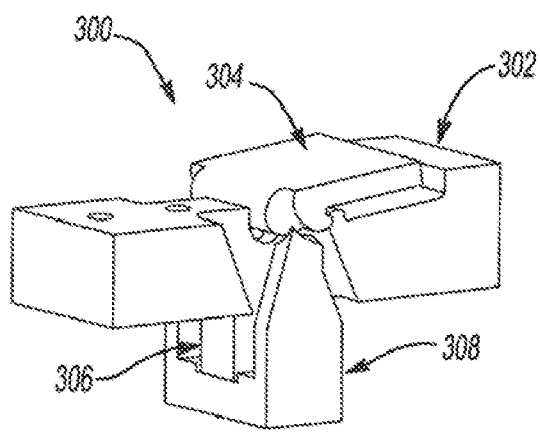
FIGS. 16A through 16C are perspective view of a tapered pole piece/strut configuration for the direct-acting electromagnetic actuator modules constructed in accordance with the present disclosure.
Figure 16B:
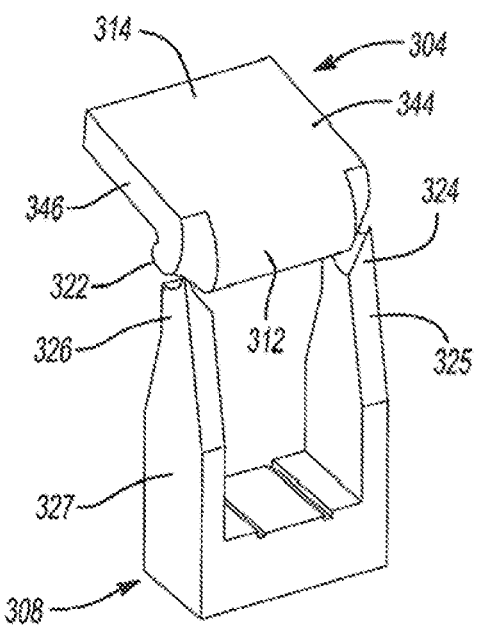
Figure 16C:
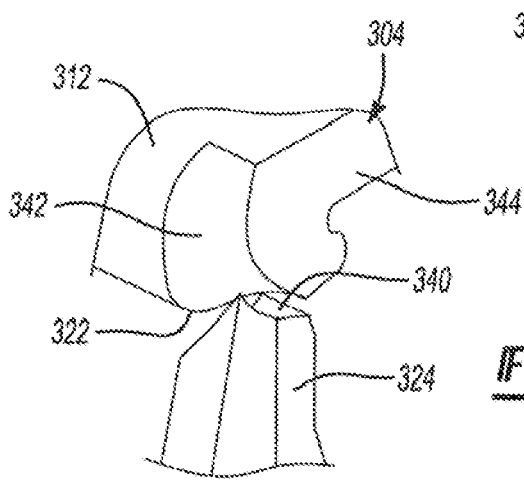

To improve the magnetic attraction, the air gap between poles 325, 327 and struts 304 can be reduced as the force of attraction increases with reductions in the air gap. To achieve this improvement, a "tapered" profile is provided to one of surface 322 of struts 304 and/or terminal ends 324, 326 of poles 325, 327. FIGS. 16A through 16C illustrate a specific example of such a tapered profile. In particular, each terminal end 324, 326 has an acute attraction surface 340 cooperating with a facing arcuate surface 342 formed on opposite edges of each pivot end 312 of struts 304. The profiles of surfaces 340 and 342 are not complimentary and are configured to reduce the air gap therebetween as struts 304 pivot from their released position toward their deployed position. The complex profile of each surface 340 and 342 is illustrated to be indicative of any non-complimentary surfaces intentionally configured to vary the magnetic attraction force. In contrast, FIG. 15 illustrates a sectional view of non-tapered or complimentary surfaces associated with pivot end of struts 304 and terminal end surfaces 324, 326 of poles 325, 327. As illustrated, in such direct-acting actuating systems, a leakage path (Arrows 341) in the magnetic field occurs between struts and frame. Even though this leakage field is weak, the attraction forced produced is counter to the attraction force produced in the primary working gaps.

In an effort to address and overcome known deficiencies in direct-acting strut-type electromagnetic actuators, the present disclosure is also directed to a number of "indirect" strut-type electromagnetic actuators that are configured to integrate an intermediate element between the coil assembly and the strut. In particular, an improved selectable one-way clutch is provided which eliminates, or at least greatly reduces, the magnetic field in the strut by introducing a magnetic armature which the magnetic poles of the coil assembly act upon. As will be detailed, the armature pivots about a point in the frame/housing and has features which mechanically engage the end segment of the strut and which functions to control pivotal movement of the strut.

Figure 17:
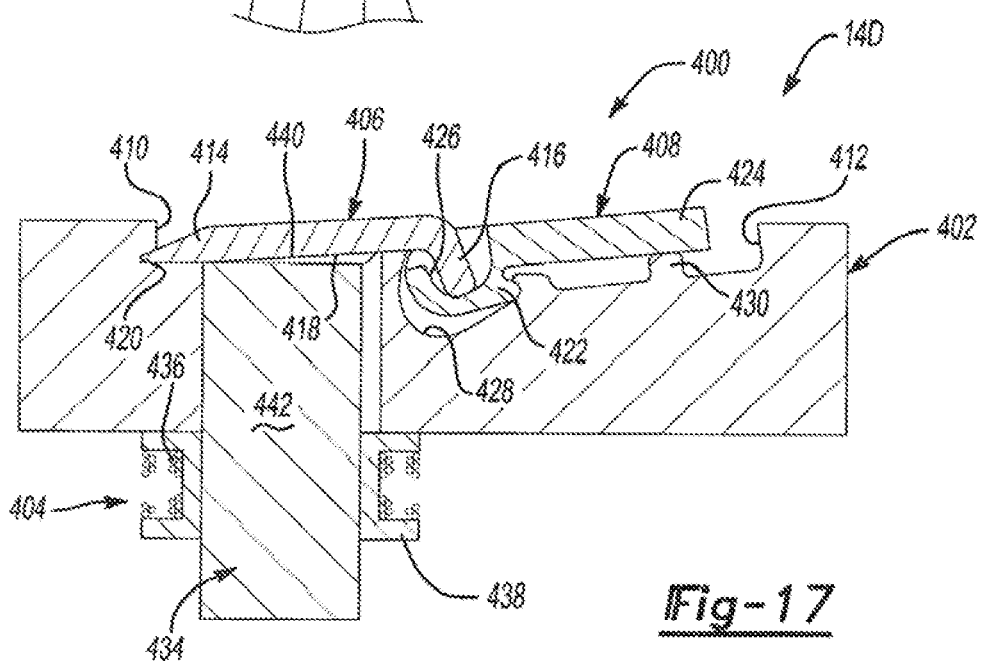
FIG. 17 is a side view of an electromagnetic actuator module adapted for use with the clutch module and having a moveable armature arranged to control pivotal movement of the strut, wherein the armature and strut are oriented in an "offset" configuration.

Referring now to FIG. 17, an electromagnetic actuator module 14D for use with the clutch module 11 in a selectable one-way clutch is shown to include an electromagnetic actuator 400 having a frame 402, a coil assembly 404, an armature 406, and a strut 408. Frame 402 is adapted to be rigidly secured to first clutch member 12 and includes a recessed pocket or chamber defining an armature chamber 410 and a strut chamber 412. Armature 406 is elongated magnetic component having a first end segment 414, a second end segment 416, and an underside surface 418. First end segment 416 is retained in a pivot channel 420 formed in armature chamber 410 to facilitate pivotal movement of armature 406 relative to coil assembly 404 between a first or "non-actuated" position (shown) and a second or "actuated" position.

Strut 408 is an elongated non-magnetized component having a base end segment 422 and an engagement end segment 424. As seen, second end segment 416 of armature 406 is retained in a coupling channel 426 formed in base end segment 422 of strut 408. Likewise, base end segment 422 of strut 408 is disposed within a pivot channel 428 formed in strut chamber 412. A biasing spring (not shown) is retained in a bore formed in pivot channel 428 and acts against base end segment 422 to normally bias strut 408 toward its released position shown. The mechanical interaction between strut 408 and armature 406 is designed to locate armature 406 in its non-actuated position when strut 408 is in its released position. Note that strut 408 engages a locator post 430 when located in its released position.

Coil assembly 404 is generally similar to those previously described and includes a U-shaped pole component 434 and, coil windings 436 on a bobbin 438 which are rigidly connected via a center core (not shown) to frame 402 via a suitable fastener (not shown). Upon energization of coil windings 436, the magnetic circuit generated causes armature 406 to be attracted to end segments 440 of the laterally-spaced arm segments 442 (one shown) associated with U-shaped pole component 434, thereby causing armature 406 to pivot from its non-actuated position toward its actuated position. Such pivotal movement of armature 406 causes concomitant pivotal movement of strut 408 from its released position to its deployed/locked position due to the mechanical connection established therebetween.

Figure 5:
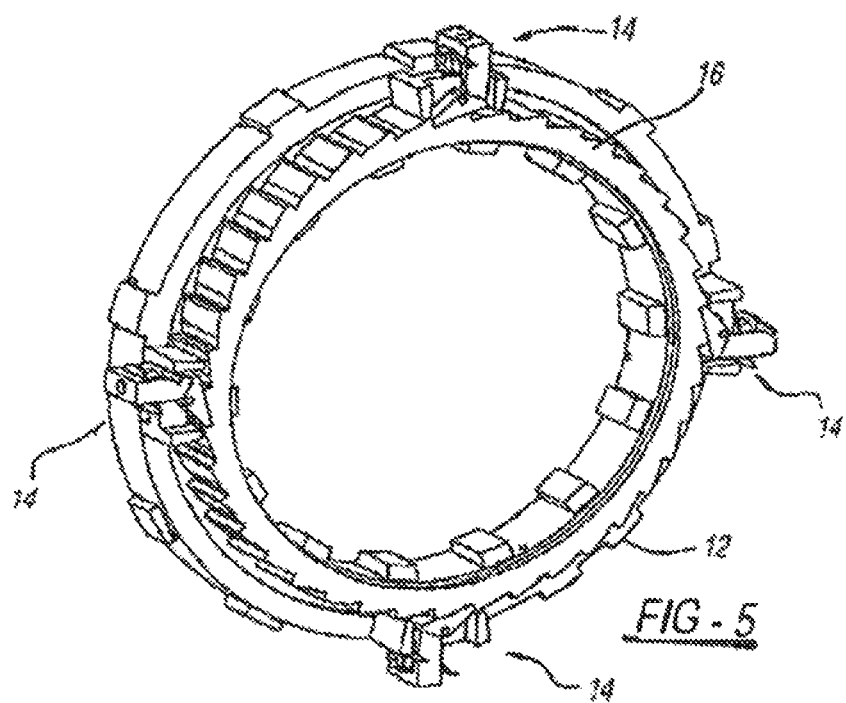
FIG. 5 is an isometric view of a selectable one-way clutch which is generally similar to the selectable one-way clutch of FIG. 1, but now showing a plurality of electromagnetic actuator modules associated with the clutch module.

The electromagnetic actuator module 14D can be used in association with a single electromagnetic actuator 400 (similar to FIG. 1); a plurality of actuator electromagnetic modules 14D arranged circumferentially around first clutch member 12 (similar to FIG. 5); arranged in a plurality of actuators 400 as part of a subassembly (similar to FIG. 6); arranged in a mirror-image configuration (similar to FIG. 9); or in any other suitable arrangement in association with a selectable one-way clutch. The configuration shown in FIG. 17 is referred to as an "offset" arrangement where armature 406 and strut 408 are aligned in a lengthwise orientation.

Figure 18:
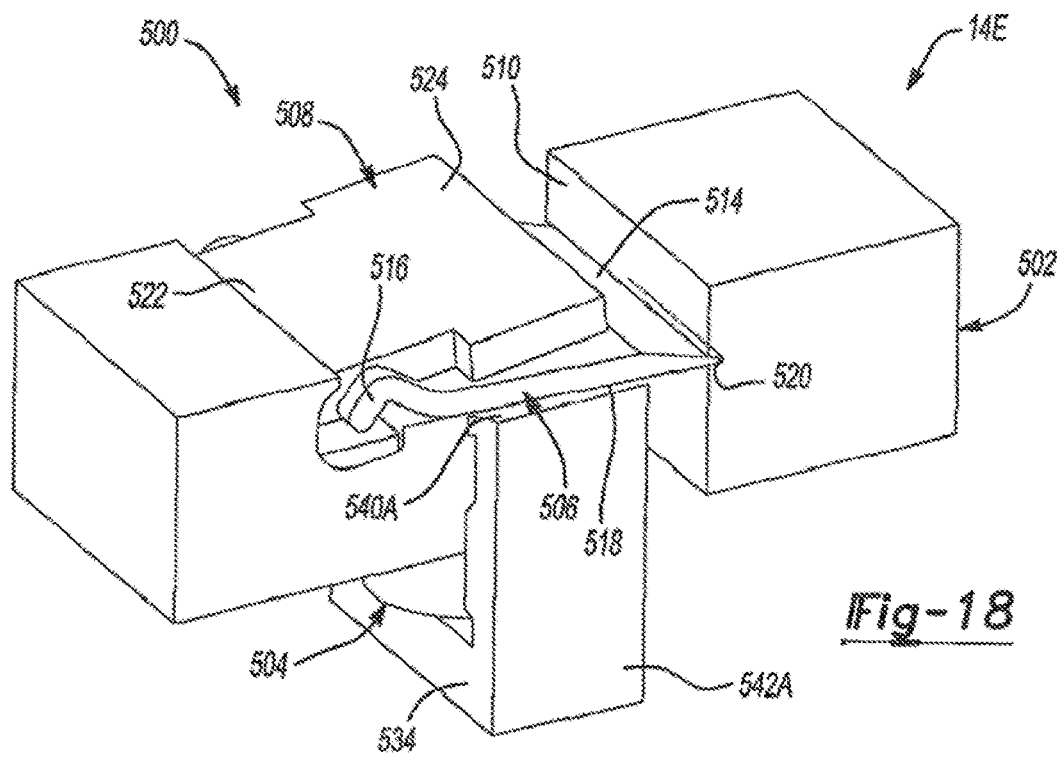
FIG. 18 is a perspective view of an alternative version of the electromagnetic actuator module shown in FIG. 17, with the armature oriented in an "under-strut" configuration.
Figure 19:
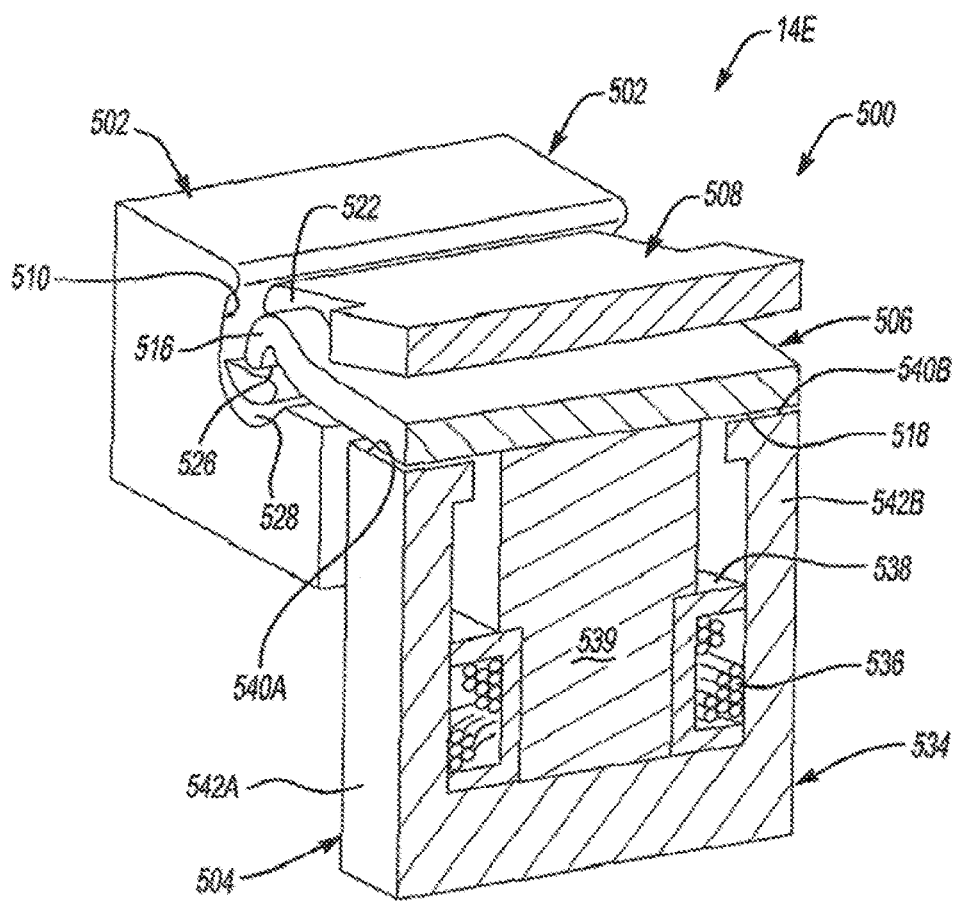
FIG. 19 is a sectional view taken through the electromagnetic actuator module of FIG. 18.

Referring now to FIGS. 18 and 19, an "under-strut" configuration for an indirect-acting electromagnetic actuator 500 installed in an electromagnetic actuator module 14E is shown and which is also adapted for use with the clutch module 11 in a selectable one-way clutch. Electromagnetic actuator module 14E is shown to generally include a frame 502 and at least one electromagnetic actuator 500. Each electromagnetic actuator 500 includes a coil assembly 504, an armature 506 and a strut 508. Frame 502 is adapted to be rigidly secured to first clutch member 12 and includes a recessed chamber 510. Armature 506 is an elongated magnetic component having a first end segment 514, a second end segment 516, and an underside surface 518. First end segment 514 is retained in a pivot channel 520 formed in chamber 510 to facilitate pivotal movement of armature 506 relative to coil assembly 504 between its non-actuated position (FIG. 18) and its actuated position (FIG. 19).

Strut 508 is an elongated non-magnetized component having a base end segment 522 and an engagement end segment 524. As seen, second end segment 516 of armature 506 is retained in a U-shaped channel 526 formed in base end segment 522 of strut 508. Base end segment 522 is disposed within a pivot channel 528 formed in chamber 510. A biasing spring (not shown) is retained in a bore formed in frame 502 which is in communication with pivot channel 528. The biasing spring acts against base end segment 522 of strut 508 to normally bias strut 508 toward its released position (FIG. 18). The mechanical interaction between armature 506 and strut 508 is configured to locate armature 506 in its non-actuated position when strut 508 is biased into its released position.

Coil assembly 504 is again generally similar to those previously described and includes a U-shaped pole member 534 and a coil winding 536 on a bobbin 538, both of which are rigidly connected via a core post 539 to frame 502 via a suitable fastener (not shown). Upon energization of coil windings 536, the magnetic circuit generated causes armature 506 to be attracted to end segments 540A, 540B of a pair of laterally-spaced arm segments 542A, 542B on pole component 534. FIG. 19 illustrates the magnetic flux path and the working gaps upon energization of coil assembly 504. This attraction causes armature 506 to pivot from its non-actuated position toward its actuated position which, in turn, concomitantly causes pivotal movement of strut 508 from its released position toward its deployed/locked position.

The under-strut arrangement disclosed in FIGS. 18 and 19 provides a compact actuator assembly 500 that can be readily adapted for use in any of the clutch assembly configurations previously disclosed. In addition, the location of the biasing spring can be varied to directly engage either strut 508 or a portion of armature 506 within chamber 510 so long as it functions to normally bias the interconnect components to the non-actuated/released positions.

Figure 20:
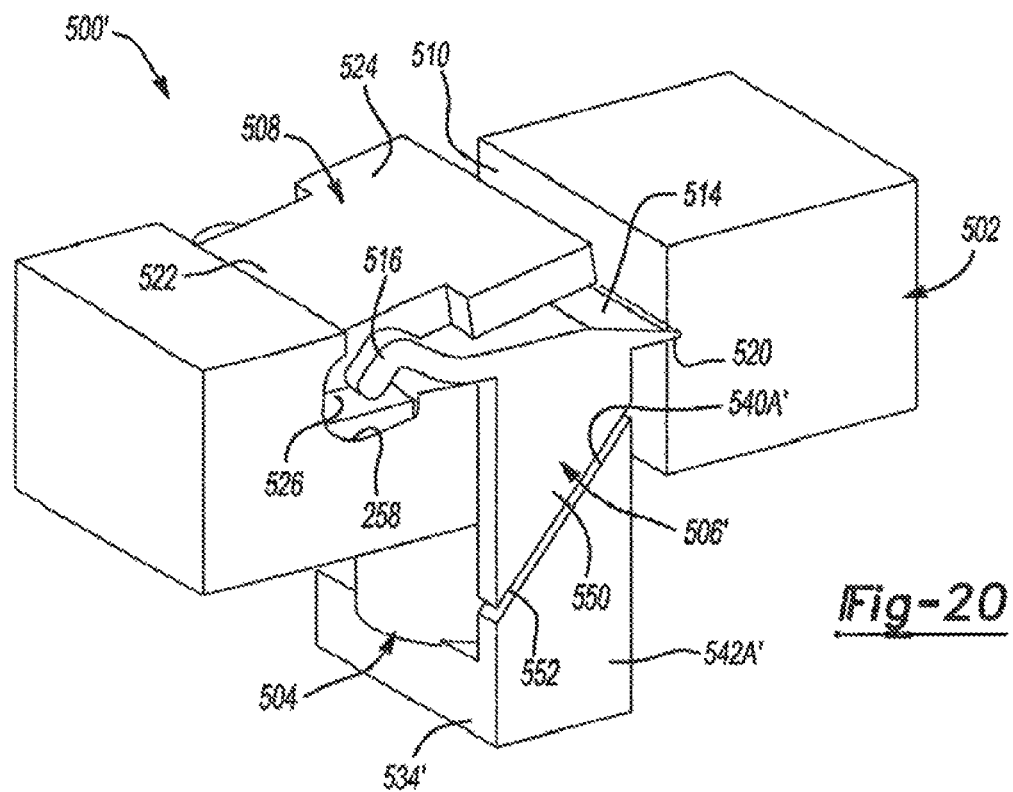
FIGS. 20 and 21 are perspective views of alternative constructions for the under-strut electromagnetic actuator module of FIG. 18 incorporating tapered pole arrangements.
Figure 21:
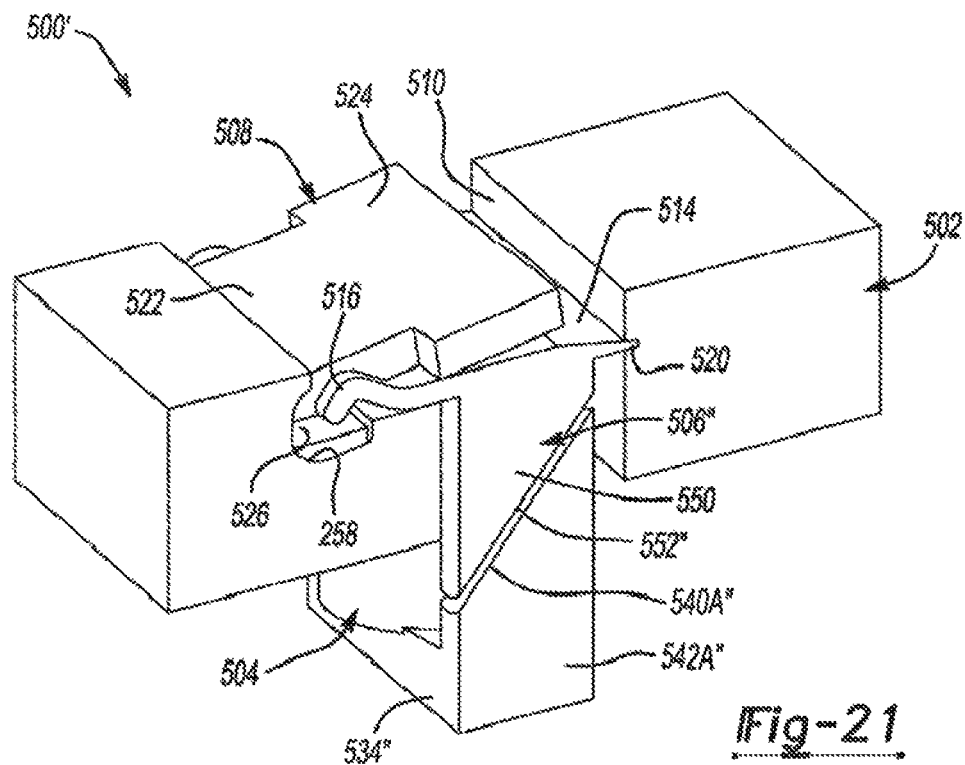

Referring now to FIGS. 20 and 21, modified versions of the under-strut electromagnetic actuator 500' for use with electromagnetic actuator module 14E of FIGS. 18 and 19 are disclosed to incorporate the "tapered" pole features previously disclosed. Specifically, electromagnetic actuator 500' of FIG. 20 is generally similar to actuator assembly 500 of FIG. 18 with the exception that armature 506' and U-shaped pole member 534' have been modified to provide a tapered working gap. As seen, armature 506' includes a pair of laterally-spaced leg sections 550 (one shown) that are aligned with leg sections 542A', 542B' of pole member 534'. In particular, armature legs 556 each define an "angled" edge surface 552 aligned with an angled edge surface 540A', 540B'. Armature 506' is still pivotable between its non-actuated and actuated positions. The configuration of the tapered/angled air gaps is designed to locate the attractions force for applying torque around the armature's pivot point. FIG. 21 is generally similar to FIG. 20 with the exception that actuate edge surfaces 552" on armature 506" are aligned with arcuate edge surfaces 540A", 540B" on pole piece 534". The terms angled and arcuate are intended to encompass all non-planar configurations that provide a tapered air gap profile.

As will be appreciated, the tapered pole arrangement shown in FIGS. 20 and 21 in association with an under-strut configuration can likewise be implemented with an offset electromagnetic actuator similar to that shown in FIG. 17.

Figure 22:
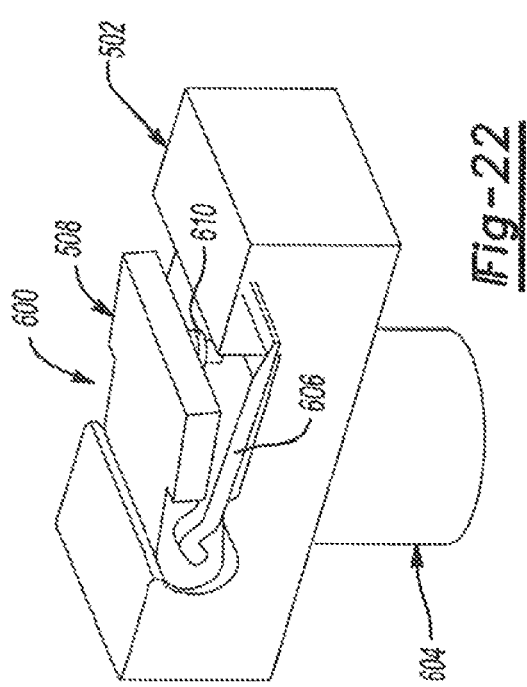
FIG. 22 is an isometric view of another alternative constructions for the under-strut electromagnetic actuator module of the present disclosure.
Figure 23:
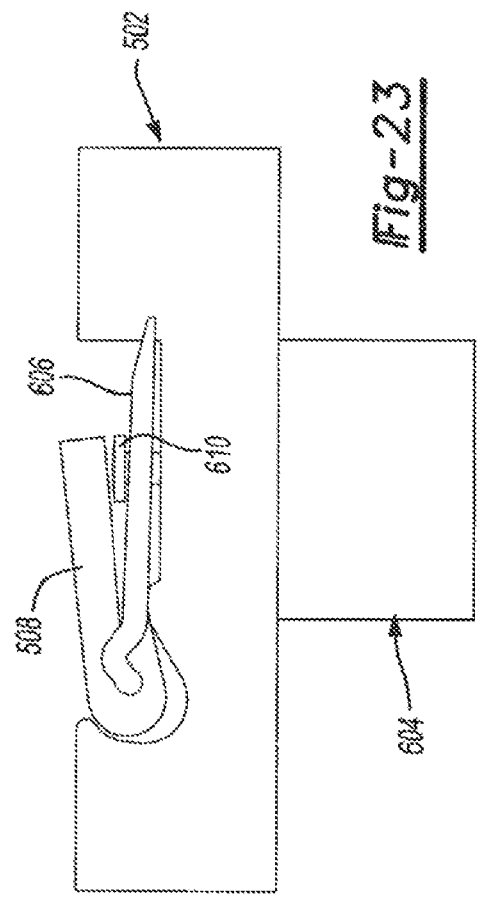
FIG. 23 is a side view of FIG. 22.
Figure 24:
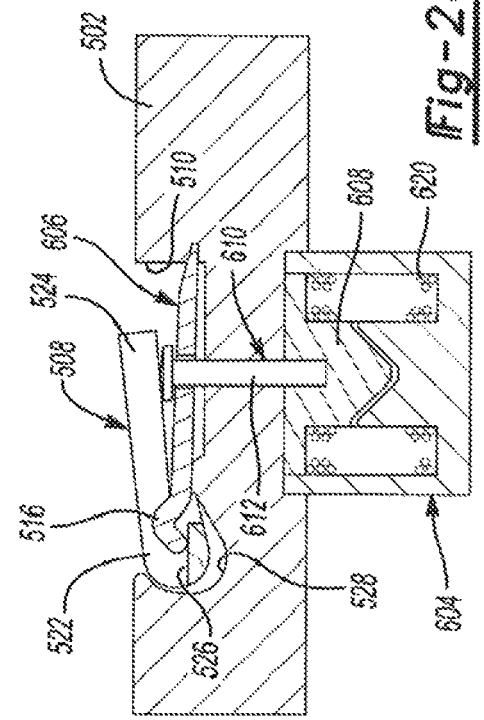
FIG. 24 is a sectional view of the electromagnetic actuator module of FIG. 22 illustrating the strut positioned in a first or non-deployed position.
Figure 25:
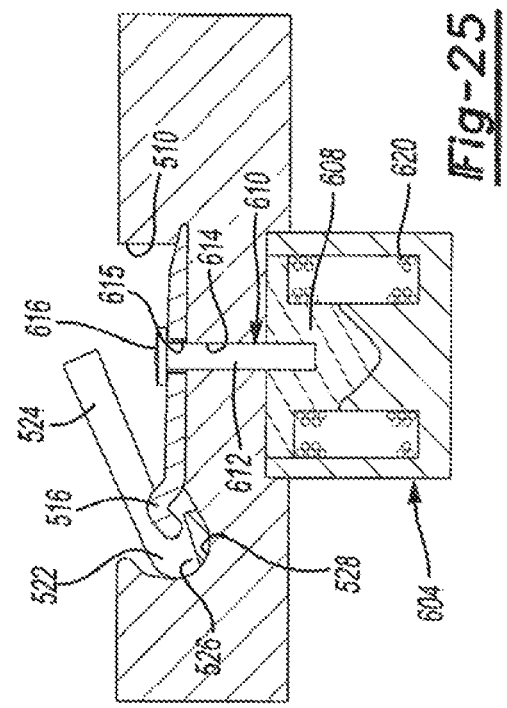
FIG. 25 is a sectional view of the electromagnetic actuator module of FIG. 22 illustrating the strut positioned in a second or deployed position.

Referring now to FIGS. 22-25, another embodiment of an under-strut electromagnetic actuator 600 is shown and which is also applicable for use with all the previously disclosed clutch modules in a selectable one-way clutch. Electromagnetic actuator assembly 600 is generally similar to electromagnetic actuator 500 shown in FIGS. 18, 19, 26 and 27, with the exception that the coil assembly 504 has been replaced with an electromagnetic solenoid assembly 604. As such, component 606 is no longer a magnetized armature, but rather functions as a mechanical linkage member 606. A linearly-moveable armature 608, associated with solenoid assembly 604, is coupled to linkage member 606 via a post 610. A stem portion 612 of post 610 passes through an aperture 614 in housing 502 and an aperture 615 in linkage member 606 and a head portion 616 is fixedly attached to stem portion 612. FIGS. 22, 23 and 24 illustrates the location of the components when a solenoid coil 620 is not energized such that strut 508 is biased (by the biasing member) to its released position which, in turn, locates linkage member 606 in its non-actuated position. In contrast, FIG. 25 illustrates that, when solenoid coil 620 is energized, armature 608 is retracted and head portion 616 acts on linkage member 606 for forcibly moving it to its actuated position which, in turn, results in pivotal movement of strut 508 to its deployed/locked position. Actuator assembly 600 is adapted to use in selectable one-way clutches if additional protection from contamination is required due to solenoid assembly 604 being enclosed and directly mounted to frame 502.

Figure 26:
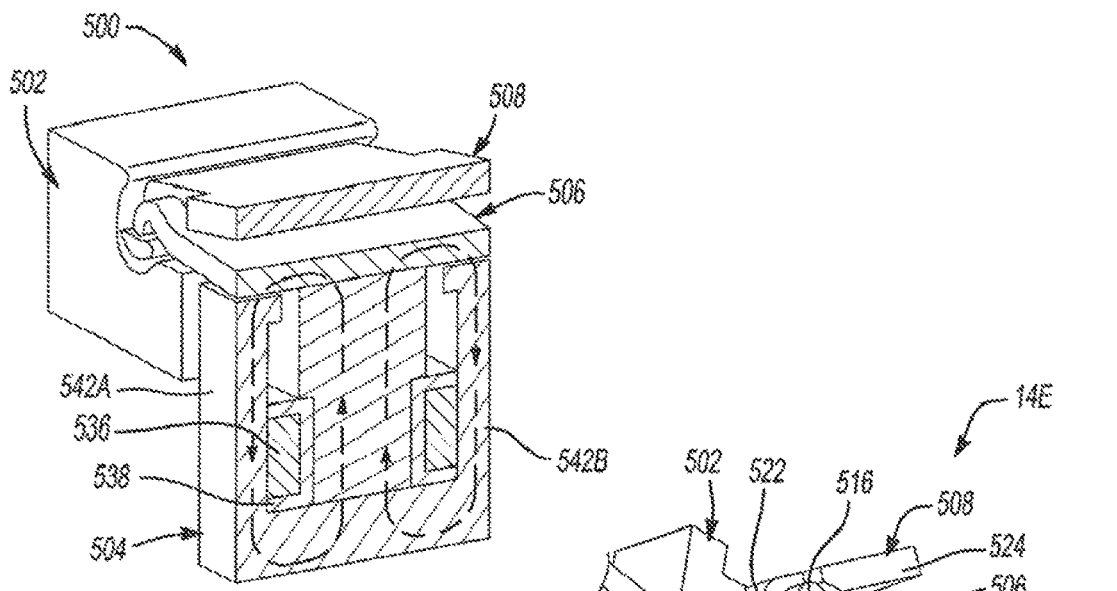
FIG. 26 is a sectional view of the electromagnetic actuator module shown in FIG. 18 equipped with a single coil type of coil assembly.
Figure 27:
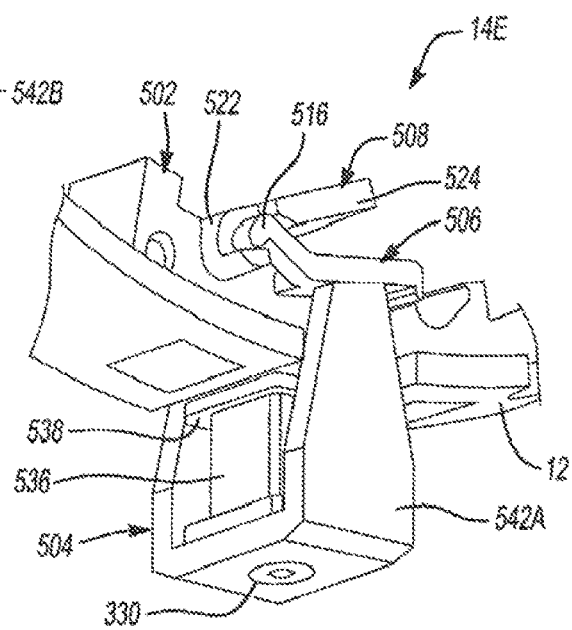
FIG. 27 is an isometric perspective view showing the electromagnetic actuator module of FIG. 18 with the strut located in its deployed position.
Figure 28:
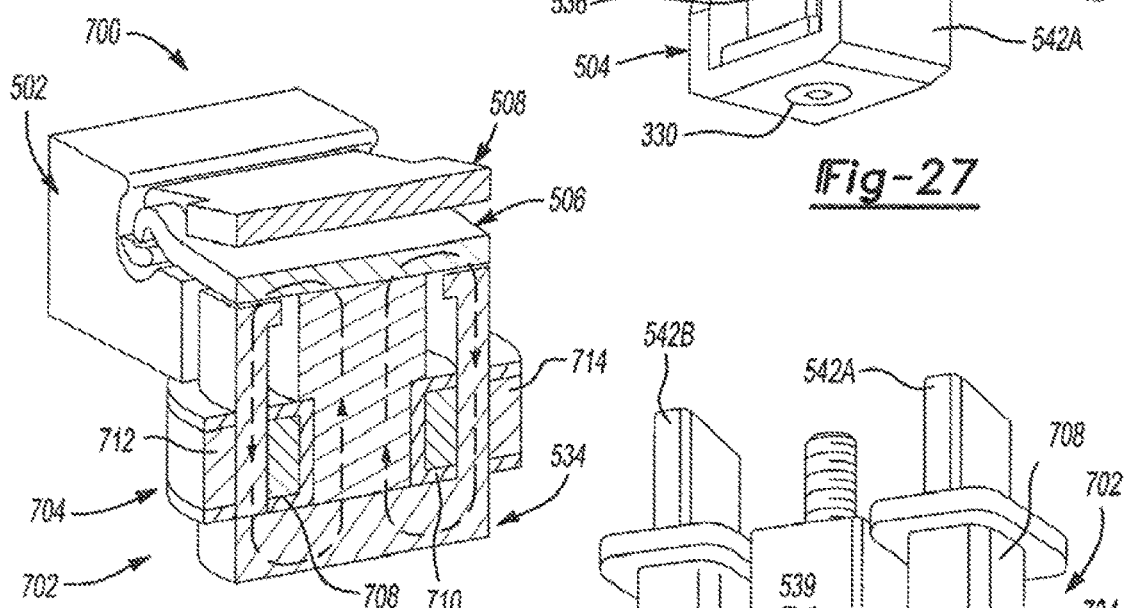
FIG. 28 is a sectional view similar to FIG. 26 but illustrating an electromagnetic actuator module equipped with a double coil type of coil assembly.
Figure 29:
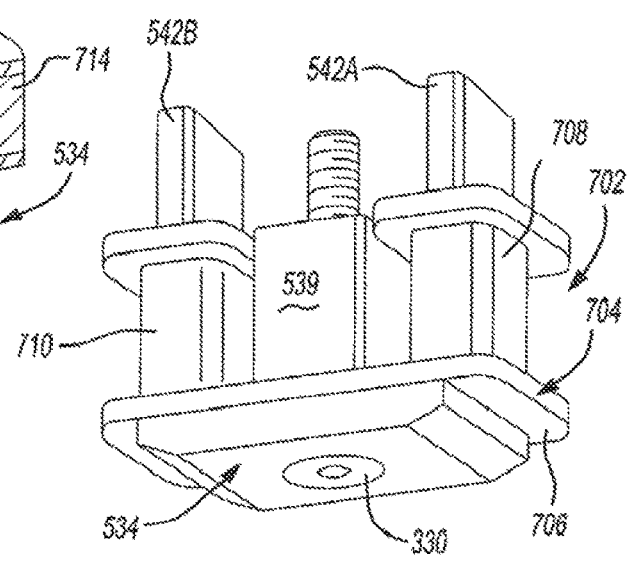
FIG. 29 is a detailed view of the double coil assembly shown in FIG. 28.
Figure 30:
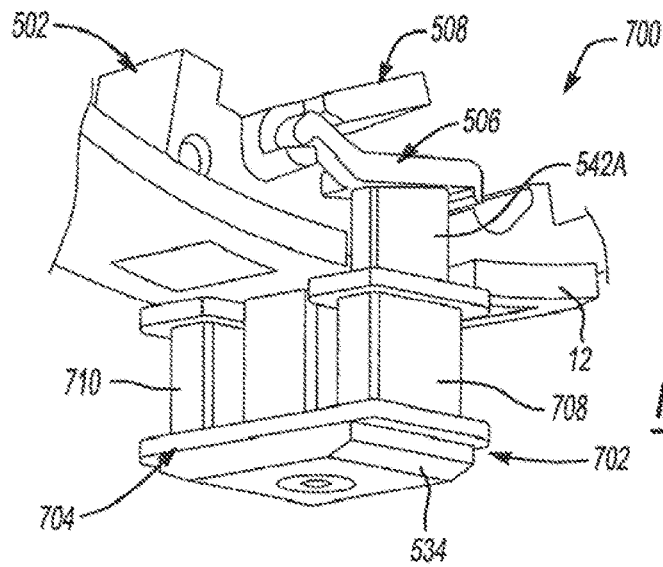
FIG. 30 is an isometric view similar to FIG. 27 but now showing the double coil assembly of FIGS. 28 and 29.

As previously noted, FIGS. 26 and 27 illustrate under-strut electromagnetic actuator assembly 500 in association with housing/frame 502 of module 14E. In an effort to improve thermal performance (run cooler) and electrical draw (less current), more copper must be added to coil winding 536. As an alternative, instead of mounting a single coil assembly on central leg/core member 539, FIGS. 28-30 illustrate an under-strut electromagnetic actuator assembly 700 equipped with as modified coil assembly 702 that is adapted for use in substitution for coil assembly 504 (or 404 in FIG. 17). In this regard, coil assembly 702 includes a bobbin 704 having a base portion 706 and a pair of spools 708, 710 that are configured to surround a portion of leg sections 542A, 542B of pole member 534. Coil windings 712, 714 are wound on respective spools 708, 710 (not shown in FIG. 28). As such, significantly more coil winding material can be utilized with coil assembly 702. Coils 712, 714 are wound in a direction such that the flux is directed in the same manner as a single coil design. The two coils 712, 714 can be connected in series or parallel. This arrangement permits use of reduced current draws and operating temperatures. FIG. 30 indicates that additional windings can be wound on leg sections 542A, 542B.

Figure 31:
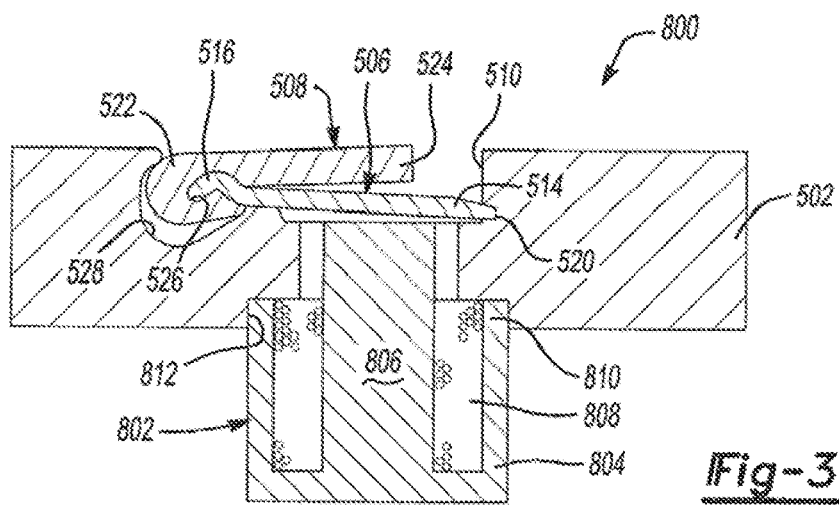
FIG. 31 illustrates yet another embodiment of an under-strut type of electromagnetic actuator module constructed in accordance with the present disclosure.

FIG. 31 illustrates another version of an electromagnetic actuator assembly 800 adapted for use with an previous actuator module and clutch module 11 to define a selectable one-way clutch in accordance with the present disclosure. In particular, a modified coil assembly 802 is shown associated with many components similar to those of electromagnetic actuator assemblies 500, 600 and 700, such that like reference numerals are again used to identify the common components. Generally speaking, coil assembly 802 includes a pot-shaped base pole piece 804 having an elongated center pole section 806 about which the bobbin/ windings 808 is installed within the internal toroidal chamber. An end 810 of base pole piece 804 is fixed within a retention aperture 812. Upon energization of the col assembly, armature 506 is magnetically attracted to center pole section 806, in opposition to the biasing force of the biasing spring (not shown), for causing pivotal movement of strut 508 to its deployed position. Thus, a single center pole is employed with base 804 being used as part of flux return path, thereby defining a pot-core magnetic circuit.

Figure 32:
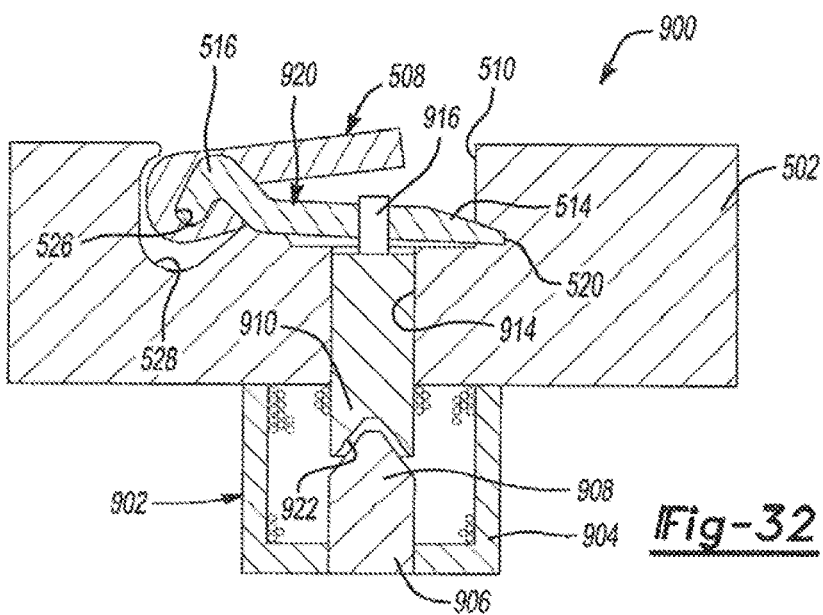
FIG. 32 is a sectional view of a further embodiment of an under-strut electromagnetic actuator module of the present disclosure.

FIG. 32 illustrates yet another version of an electromagnetic actuator assembly 900 adapted for use in association with an previously disclosed actuator module and/or clutch module to define a selectable one-way clutch constructed in accordance with the present disclosure. Specifically, coil assembly 902 includes a pot-shaped base member 904 having a center pole segment 906. Base pole member 904 is adapted to be mounted to frame 502 for connection to first clutch member 12 of the clutch module 11. A frusto-conical male end portion 908 of center pole 906 is positioned in close proximity to a frusto-conical female end portion 910 of a linearly-moveable armature plunger 912. Armature plunger 912 is slideably disposed within a bore 914 extending through frame 502 and has a post segment 916 fixedly secured to a pivotal intermediate member 920. An isolator tube may be used to magnetically isolate armature plunger 912 from housing 502. Intermediate member 920 is identical in structure to armature 506 of assembly 500, but now is configured to only provide a mechanical connection between sliding armature or plunger 912 and strut 508. An conical air gap 922 is provided between plunger end portion 910 and male end portion 908 of center pole 906. Upon energization, armature plunger 912 is retracted inwardly which, in turn, causes intermediate member 920 to pivot from the non-actuated position shown to its actuated position. As before, such pivotal movement of member 920 results in pivotal movement of strut 508 from its released position into its deployed position. Since the air gap 422 is centrally located, its improves the attraction force and reduces flux leakage in the magnetic circuit.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A selectable one-way clutch, comprising:
a clutch module including a first clutch member and a second clutch member having a plurality of cam surfaces, wherein at least one of said first and second clutch members is adapted to rotate relative to the other of said first and second clutch members; and
an electromagnetic actuator including an energizeable coil assembly secured to said first clutch member, a first member mounted on said first clutch member for pivotal movement relative to said coil assembly between a non-actuated position and an actuated position, a second member mechanically coupled to said first member such that movement of said first member between its non-actuated and actuated position causes concomitant pivotal movement of said second member between a released position displaced from engagement with said cam surfaces on said second clutch member and a locked position in engagement with one of said cam surfaces on said second clutch member, and a biasing member for normally biasing said second member to its released position.

2. The selectable one-way clutch of claim 1, wherein said first member is a magnetic armature that is pivotably moveable relative to a magnetic pole member of said coil assembly, wherein said armature includes a first end segment pivotably mounted to said first clutch member and a second end segment mechanically connected to a base end segment of said second member, and wherein said second member has an engagement end segment adapted to lockingly engage said cam surfaces.

3. The selectable one-way clutch of claim 2, wherein said second member is a locking strut having its base end segment pivotably disposed within a pivot channel formed in said first clutch member.

4. The selectable one-way clutch of claim 3, wherein said armature and said locking strut are oriented in an offset configuration with said second end segment of said armature disposed in a coupling channel formed in said base end segment of said locking strut, and wherein said biasing member acts on said base end segment of said locking strut for normally biasing said locking strut to its released position.

5. The selectable one-way clutch of claim 4, wherein said second end segment of said armature is disposed in a pivot channel formed in said base end segment of said locking strut.

6. The selectable one-way clutch of claim 3, wherein said armature and said locking strut are oriented such that said armature is disposed between said magnetic pole member of said coil assembly and said locking strut in an under-strut configuration.

7. The selectable one-way clutch of claim 2, wherein said magnetic pole member includes a U-shaped member having a pair of laterally-spaced leg sections each having a peripheral end surface forming an air gap with an intermediate segment of said armature located between its first and second end segments, and wherein said second end segment of said armature is disposed in a pivot channel formed in said base end segment of a locking strut.

8. The selectable one-way clutch of claim 7, wherein said intermediate segment of said armature includes at least one arm segment configured to be aligned with at least one of said laterally-spaced leg segments of said pole member, and wherein said arm segment has a peripheral end surface forming an air gap with a corresponding one of said peripheral end surfaces of said leg segments.

9. The selectable one-way clutch of claim 8, wherein said peripheral end surface of said arm segment on said armature and said leg segment on said pole member are tapered.

10. The selectable one-way clutch of claim 1, wherein energization of said coil assembly generates a magnetic circuit that attracts said first member and forcibly moves said first member from its non-actuated position to its actuated position which causes said second member to move from its released position to its locked position.

11. The selectable one-way clutch of claim 1, wherein said first member is a connection member having a first end segment pivotably mounted to said first clutch member, a second end segment mechanically connected to said second member, and an intermediate segment disposed between said first and second end segments, and wherein said coil assembly includes a linearly-moveable plunger coupled to said intermediate segment of said connection member, said plunger operable in an extended position to permit said connection member to be located in its non-actuated position and further operable in a retracted position to forcibly move said connection member to its actuated position for moving said second member to its locked position.

12. The selectable one-way clutch of claim 11, wherein said second member is a locking strut having a base end segment pivotably mounted to said first clutch member and an engagement end segment adapted to locking engage one of said cam surfaces when said locking strut is moved into its locked position, and wherein said second end segment of said connection member is pivotably coupled to said base end segment of said locking strut.

13. The selectable one-way clutch of claim 1, wherein said coil assembly includes a base member mounted to said first clutch member and having a center pole piece, wherein said first member is a magnetic armature pivotably moveable relative to said center pole piece, wherein said armature includes a first end segment pivotably mounted on said first clutch member, a second end segment mechanically connected to said second member, and an intermediate segment establishing a magnetic circuit with said center pole piece upon energization of said coil assembly.

14. The selectable one-way clutch of claim 13, wherein said second member is a locking strut having a base end segment pivotably mounted to said first clutch member and an engagement end segment adapted to lockingly engage one of said cam surfaces upon movement of said locking strut to its locked position.

15. A selectable one-way clutch comprising:
a first clutch member;
a second clutch member rotatable relative to said first clutch member and having a plurality of ratchet teeth;
an electromagnetic actuator having an energizeable coil assembly secured to said first clutch member;

a magnetic armature having a first end segment retained in an armature pivot channel formed in said first clutch member to facilitate pivotal movement of said armature relative to said coil assembly between a non-actuated position when said coil assembly is non-energized and an actuated position when said coil assembly is energized, and a second end segment;

a non-magnetic strut having a base segment disposed in a strut pivot channel formed in said first clutch member and engaging said second end segment of said armature, and an engagement end segment, wherein movement of said armature between its non-actuated and actuated positions cause concomitant pivotal movement of said strut from a released position whereat said engagement end segment is disengaged from said ratchet teeth on said second clutch member and a locked position whereat said engagement end segment is in latched engagement with said ratchet teeth; and a biasing member normally biasing said strut to its released position.

16. The selectable one-way clutch of claim 15, wherein said coil assembly includes a magnetic pole piece, and wherein an intermediate segment of said armature located between its first and second end segments is aligned with said pole piece.

17. The selectable one-way clutch of claim 16, wherein said armature and said strut are oriented in an offset configuration with said second end segment of said armature disposed in a coupling channel formed in said base end segment of said strut, and wherein said biasing member acts on said base end segment of said strut for normally biasing said locking strut to its released position.

18. The selectable one-way clutch of claim 16, wherein said armature and said locking strut are oriented such that said armature is disposed between said magnetic pole member of said coil assembly and said strut in an under-strut configuration.

19. The selectable one-way clutch of claim 16, wherein energization of said coil assembly generates a magnetic circuit that attracts said intermediate segment of said armature toward said pole piece and forcibly moves said armature from its non-actuated position to its actuated position which causes said second end segment to act on said base segment of said strut and move said strut from its released position to its locked position in opposition to the biasing of said biasing member.

20. The selectable one-way clutch of claim 19, wherein said biasing member is a strut spring disposed between said first clutch member and said base segment of said strut.

* * * * *